United States Patent
Lu et al.

(10) Patent No.: US 11,093,816 B2
(45) Date of Patent: *Aug. 17, 2021

(54) CONVOLUTIONAL NEURAL NETWORK (CNN)-BASED ANOMALY DETECTION

(71) Applicant: salesforce.com, inc., San Francisco, CA (US)

(72) Inventors: Chang Lu, Vancouver (CA); Lingtao Zhang, Coquitlam (CA)

(73) Assignee: salesforce.com, inc., San Francisco, CA (US)

(*) Notice: Subject to any disclaimer, the term of this patent is extended or adjusted under 35 U.S.C. 154(b) by 987 days.

This patent is subject to a terminal disclaimer.

(21) Appl. No.: 15/726,267

(22) Filed: Oct. 5, 2017

(65) Prior Publication Data
US 2019/0108432 A1  Apr. 11, 2019

(51) Int. Cl.
*G06N 3/04* (2006.01)
*G06N 3/08* (2006.01)

(52) U.S. Cl.
CPC ............... *G06N 3/04* (2013.01); *G06N 3/08* (2013.01)

(58) Field of Classification Search
CPC .. G06N 3/04; G06N 3/08; G06N 5/02; G06N 20/00
See application file for complete search history.

(56) References Cited

U.S. PATENT DOCUMENTS

2013/0282645 A1* 10/2013 Culbertson ............ G06F 40/232
                                                                 706/52
2015/0127594 A1*  5/2015 Parada San Martin ....................
                                                                 G06N 3/0454
                                                                 706/16
2016/0180214 A1*  6/2016 Kanevsky ............ G10L 15/063
                                                                 706/21

OTHER PUBLICATIONS

Wei Li, Guodong Wu, and Qian Du, "Transferred Deep Learning for Anomaly Detection in Hyperspectral Imagery", May 2017, IEEE Geoscience and Remote Sensing Letters, vol. 14, No. 5, pp. 597-601. (Year: 2017).*
Joshua Saxe and Konstantin Berlin, "eXpose: A Character-Level Convolutional Neural Network with Embeddings for Detecting Malicious URLs, File Paths and Registry Keys", Feb. 27, 2017, arXiv, pp. 1-18. (Year: 2017).*

* cited by examiner

*Primary Examiner* — Kamran Afshar
*Assistant Examiner* — Ying Yu Chen
(74) *Attorney, Agent, or Firm* — Haynes and Boone, LLP

(57) ABSTRACT

The technology disclosed determines which field values in a set of unique field values for a particular field in a fielded dataset are anomalous using six similarity measures. A factor vector is generated per similarity measure and combined to form an input matrix. A convolutional neural network processes the input matrix to generate evaluation vectors. A fully-connected network evaluates the evaluation vectors to generate an anomaly scalar for a particular unique (Continued)

field value. Thresholding is applied to anomaly scalar to determine whether the particular unique field value is anomalous.

19 Claims, 11 Drawing Sheets

CONVOLUTIONAL NEURAL NETWORK (CNN)-BASED ANOMALY DETECTION

RELATED APPLICATIONS

This application is related to U.S. application Ser. No. 15/726,268 entitled "CONVOLUTIONAL NEURAL NETWORK (CNN)-BASED SUGGESTIONS FOR ANOMALY INPUT", filed contemporaneously. The related application is incorporated by reference herein.

FIELD OF THE TECHNOLOGY DISCLOSED

The technology disclosed relates generally to data cleaning apparatus and corresponding methods for the detection of anomalous data stored in a fielded database or as computer files, and in particular relates to implementing a convolutional neural network that takes identifies the anomalous field values and suggests correct field values to replace anomalous field values.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

A large amount of data is being generated by today's business systems. Organizations use this data as input to business intelligence (BI) systems. These systems require high quality input data. Current data cleaning techniques require significant human intervention to clean data. Moreover, typically only one criterion or a limited number of criteria can be applied at any given input field of a fielded dataset to identify anomalous field values. Therefore, existing data cleaning techniques are not scalable and efficient. An opportunity arises to develop a data cleaning technique that does not require significant human intervention and is scalable. Effective and efficient data cleaning may result.

APPENDICES

The following are attached hereto as part of this disclosure:

Appendix A is a presentation showing examples of data structures, algorithms, neural network architectures, and experimental results at a high-level.

Appendix B is a report showing examples of data structures, algorithms, neural network architectures, and experimental results in greater detail.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
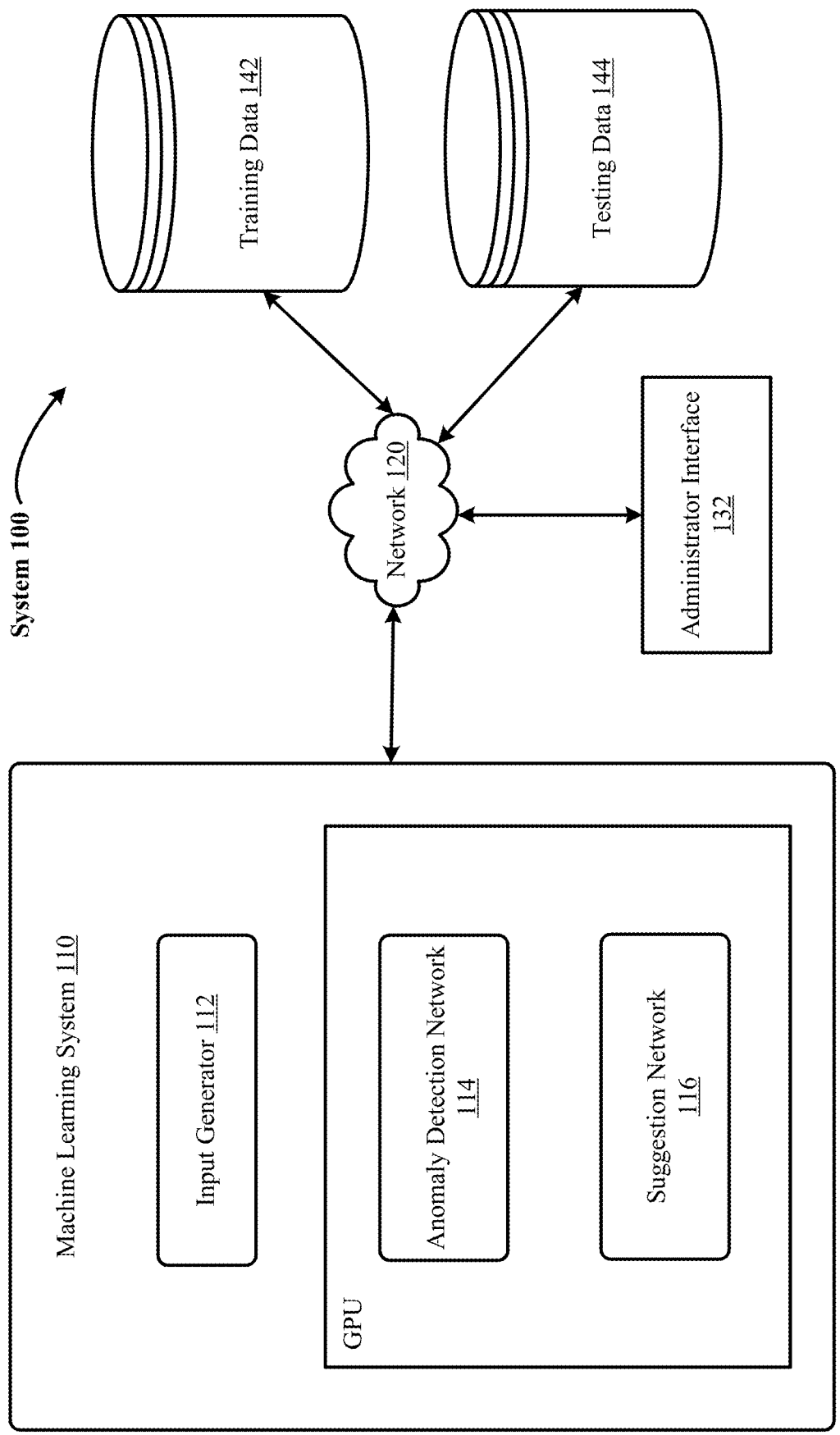
FIG. 1 shows aspects of a system in which a machine learning system detects anomalous field values and suggests correct field values to replace anomalous field values.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

More and more companies are using data to help drive their business decisions. Data is collected from a variety of sources including sales processes, accounting systems, call centers, etc. Business intelligence (BI) systems analyze data from a variety of sources. Before data is consumed by BI systems, it needs to be cleaned to make sure any conclusion based on the data is reliable. Data Scientists typically spend more than 70% of the time cleaning the data before doing any data analysis. Large amounts of data generated by today's business systems make manual data cleaning process very expensive. A convolutional neural network (CNN) is trained to identify anomalous field values in a fielded dataset. The CNN speeds up the data cleaning process by reducing the effort required to clean the data by automatically detecting anomalous field values.

The CNN uses hints based on six similarity measures, which cover both semantic and syntactic aspects of fielded data, to identify anomalous field values in a particular input field. The six similarity measures are semantic similarity, syntactical similarity, soundex similarity, length similarity, frequency of occurrence similarity and format similarity. A key element of the technology disclosed is extraction of hints from the fielded data for the six similarity measures and organizing these hints in the form of vectors that can be processed by the CNN.

The training data for the CNN is generated artificially. Separate datasets are generated for five of the similarity measures listed above except the frequency of occurrence similarity measure. Each dataset contains separate collection of similar and dissimilar unique field values. A training dataset is generated by randomly picking field values from similar and dissimilar field values. To generate frequency similarity data, each of the unique field values in the field is multiplied with a randomly generated positive integer. For production, real world testing data is used from public data sources. The higher the quality of input data for training, the higher the accuracy of the CNN in production.

Data cleaning of a data field is composed of two processes: anomaly detection and anomaly suggestion. A separate CNN is used for each of these two processes: an anomaly detection network and a suggestion network. The respective CNNs are trained separately. Anomaly detection CNN can reach 97% detection for anomaly and 88% detection for non-anomaly on training set, and 60%, 83% detections respectively on testing set. Suggestion CNN can reach 60% accuracy on training set and 70% on testing set.

There are two ways to apply the anomaly detection and anomaly suggestion networks to identify anomalous data and clean it. The first option is automatic detection-suggestion flow. In the first option, the anomalous field values identified by the anomaly detection network are automatically passed to the suggestion network. The suggestion network identifies a correct field value for each anomalous field value and replaces the anomalous field value with correct field value. The second option to combine the anomaly detection and suggestion networks is to get expert feedback after the detection of anomalous field values. This is to avoid the passing false positives to the suggestion network. This helps the user to understand the results and provide feedback. The second option to combine the anomaly detection and suggestion networks requires more interaction from an expert, but generally gains higher accuracy.

System Overview

We describe a system for detecting anomalous field values for a particular field in a fielded dataset. The system and processes are described with reference to FIG. 1 showing an architectural level schematic of a system in accordance with an implementation. Because FIG. 1 is an architectural diagram, certain details are intentionally omitted to improve the clarity of the description.

The discussion of FIG. 1 is organized as follows. First, the elements of the figure are described, followed by their interconnections. Then, the use of the elements in the system is described in greater detail.

FIG. 1 includes the system 100. The system 100 includes a machine learning system 110, a network 120, a training database 142, a testing database 144 and an administrator interface 132. The machine learning system 110 includes an input generator 112, an anomaly detection network 114 and a suggestion network 116. At a high level, the input generator 112 generates input data for the anomaly detection network 114 and the suggestion network 116. The data that is consumed by the input generator 112 is provided by the training database 142 during training and by the testing database 144 during production.

The anomaly detection network 114 determines which field values in a set of field values for a particular field in a fielded dataset are anomalous. The suggestion network 116 determines that one or more field values in a set of field values are similar to an input value for a particular field in a fielded dataset. Both anomaly detection network 114 and suggestion network 116 can run on a variety of hardware processors such as graphic processor units (GPUs). Neural network-based models involve computationally intensive methods, such as convolutions and matrix-based operations. GPUs are well suited for these types of computations. Recently, specialized hardware is being developed to efficiently train neural network models.

During training of the anomaly detection network 114 and the suggestion network 116, the input generator 112 receives data from the training database 142 and processes it to generate input for the anomaly detection network 114 and the suggestion network 116. During production, the input generator 112 receives data from the testing database 144 and processes it to produce input for the anomaly detection network 114 and the suggestion network 116.

The administrative interface 132 can be used during training or production to provide input data to the input generator 112 from respective databases. The administrative interface 132 can also be used during training to control model parameters of the anomaly detection network 114 and the suggestion network 116. The machine learning system 110, the training database 142, the testing database 144 and the administrative interface 132 are in communication with each other via the network(s) 120. After presenting a high level description of the system 100, the discussion now turns to detailed description of various components of the system 100.

Anomaly Detection Network

Figure 2A:
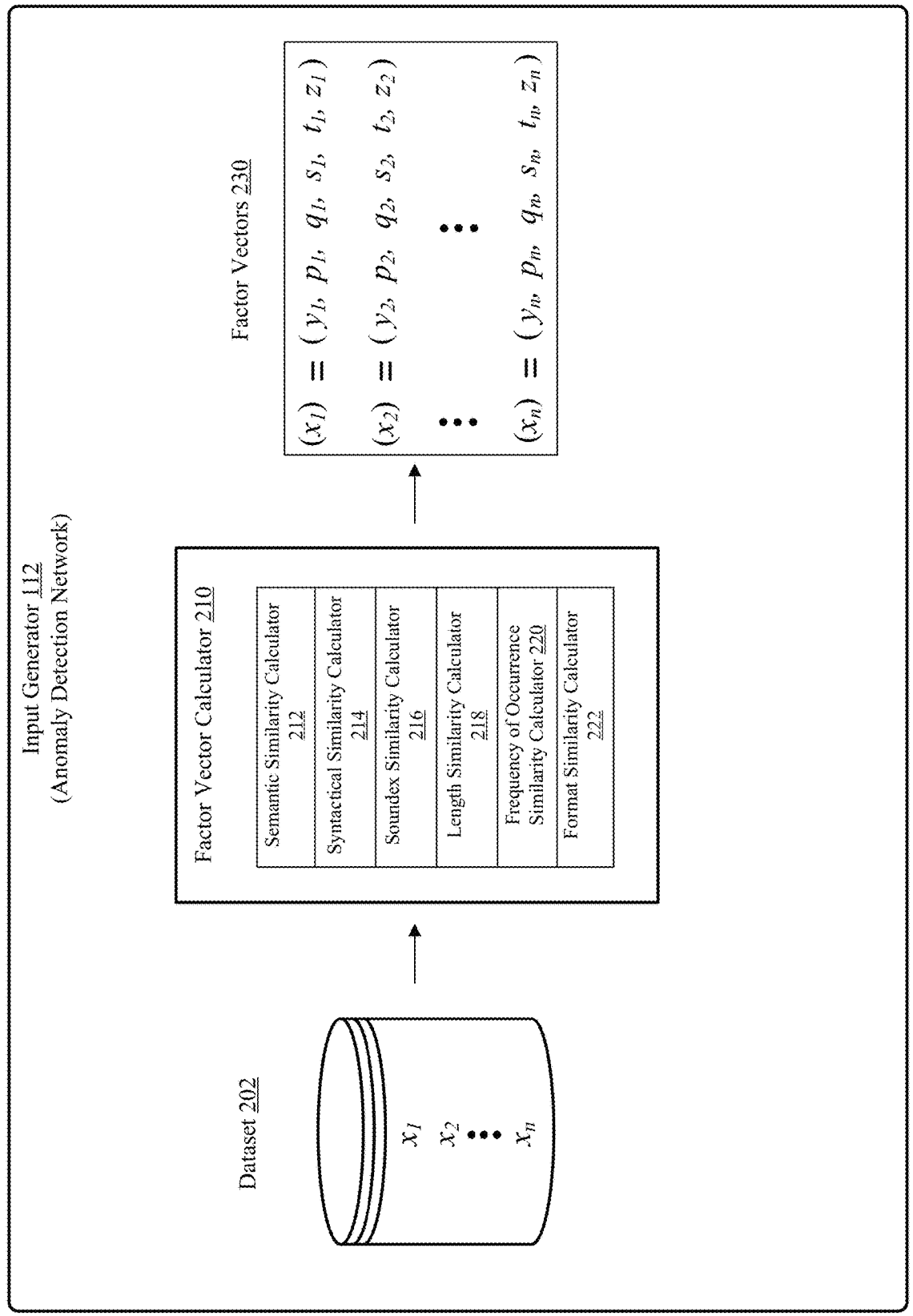
FIG. 2A depicts one implementation of an input generator for anomaly detection network of FIG. 1 using six similarity calculators.

FIG. 2A illustrates operation of the input generator 112 to generate input data for the anomaly detection network 114 during training. The input generator 112 takes a dataset 202 as input. During training, the dataset 202 is generated from the training database 142 and during production, the dataset 202 is generated from the testing database 144. The dataset 202 is composed of field values. In the more common use case, these field values are word tokens. In other implementations, field values can be character tokens or phrase tokens. An example of a word token is "John" and an example of a phrase token is "J. P. Morgan". The dataset 202 is a fielded dataset which means it can have fields such as "First Name", "Last Name", "Company Name", "Country" etc., and data is organized as field values in the fields.

The input generator 112, generates factor vectors 230 for a plurality of similarity measures (also referred to as linguistic similarity measures). In one implementation, six similarity measures are used. The six similarity measures are semantic similarity, syntactical similarity, soundex similarity, length similarity, frequency of occurrence similarity and format similarity. In other implementations fewer than six or more than six similarity measures can be used. A factor vector calculator 210 contains similarity measure calculators for each similarity measure. FIG. 2A shows six similarity measure calculators corresponding to six similarity measures listed above. A semantic similarity calculator 212 calculates semantic similarity measure, a syntactical similarity calculator 214 calculates syntactical similarity measure, a soundex similarity calculator 216 calculates soundex similarity measure, a length similarity calculator 218 calculates length similarity measure, a frequency of occurrence similarity calculator 220 calculates frequency similarity measure and a format similarity calculator 222 calculates format similarity measure.

Semantic similarity between two field values of a particular input field of the fielded dataset is calculated using either Word2Vec, WordNet or GloVe model. Two given input field values of the input field are semantically similar to each other if their meaning are similar in the vocabulary. For example, consider a field listing fruit names, a first field value "apple" is semantically similar to a second field value "orange". In the same field, the first field value "apple" is not semantically similar to a third field value "airplane". Every field value of the particular field is compared with every other field value in the same field to determine semantic similarity measure between them. For this purpose, two field values are passed to one of the selected models listed above. The model represents each field value as a word vector in a low dimensional embedding space (typically between 100 to 1000 dimensions). An inner product or dot product of two multidimensional vector representations of the field values is calculated by the selected model. The results of the calculations are used to fill the n×n similarity matrix for semantic similarity measure, where "n" is the number of unique field values (also referred to as words, word phrases or tokens) in the field.

Syntactic similarity between two field values of a particular field of the fielded dataset is calculated using a so called "bag of letters" algorithm. The syntactic similarity between two input field values indicates how similar they are in terms of the arrangement of the characters in the field values. For example, a first field value "gardenia" is syntactically similar to a second field value "grandniece" in a particular input field. The first input value "gardenia" is not syntactically similar to a third input value "hoff" in the same input field. The syntactic similarity is calculated between every two field values of a given field. For this purpose, two field values are given as input to the "bag of letters" algorithm. In a first step of the algorithm, all upper case letters in the two field values are converted to respective lower case letters. The characters in both field values are then converted to equivalent American Standard Code for Information Interchange (ASCII) codes. In the next step, the algorithm represents each input field value as a multidimensional vector in a character embedding space. The dimensionality of the embedding space is equal to number of codes in ASCII. Multiple occurrences of the same character are represented as magnitude on that character's respective dimension. Finally, the "bag of letters" algorithm, calculates an inner product or dot product of the multidimensional vector representations of the two input field values. The results of the calculations are used to fill the n×n similarity matrix for syntactic similarity measure where "n" is the number of unique field values in the particular field.

Soundex similarity between two field values of a particular field indicates how similar they are in terms of their respective pronunciations in the English language. For example, a first field value "abel" is soundex similar to a second field value "flail" in a particular field. The first field value "abel" is not soundex similar to a third input field value "rowe" in the same field of the fielded dataset. In one implementation, a custom algorithm is used to determine the soundex similarity between two input field values by determining corresponding positions of similar sounding English alphabets in respective field values. In other implementations, soundex algorithms such as Metaphone or Double Metaphone can be used to determine soundex similarity between two input field values. A soundex similarity score of each field value is calculated with every other field value in a particular input field of the fielded dataset. The results of the calculations are used to fill the n×n similarity matrix for soundex similarity measure where "n" is the number of unique words or tokens in the input field.

Format similarity between two input field values indicates how similar they are in terms of their formats. For example, a first field value "0x12345" is similar in format to a second field value "0x32749" in a particular field. The first field value "0x12345" is not format similar to a third field value "1234567" in the same input field of the fielded dataset. In one implementation, a custom format matching algorithm is given two field values of a particular field as input. The format matching algorithm calculates a format similarity score for the two field values by comparing characters at corresponding positions in the two field values. A format similarity score for each field value is calculated with every other field value in a particular input field of the fielded dataset. The results of the calculations are used to fill the n×n similarity matrix for format similarity measure where "n" is the number of unique field values in the particular field.

Length similarity measure is used to identify field values that are longer or shorter than average length of field values in a particular field. For example, consider field values "firm", "lamb", "coon", "key", "septuagenarian", "x" in a particular input field. The length similarity measure will identify the field values "septuagenarian", and "x" as anomalous because their respective lengths are too long or too short than average length of field values in the particular input field. In one implementation, the algorithm to calculate the length similarity measure first generates the length of each field value. Following this, the algorithm determines a Z-score (also referred to as standard score) using mean and standard deviation. The Z-score is statistical measure of a score's relationship to the mean in a group of scores. The values of Z-scores are normalized using the largest Z-score value. The normalized values of Z-scores range between "0" and "1" inclusive. A normalized Z-score of zero means the score is the same as the mean which means the corresponding input field value lies at the mean. A higher normalized Z-score value implies the score is farther away from the mean. The corresponding field value is either too short in length or too long in length compared to other field values in the particular field. A normalized Z-score of "1" means the corresponding input field value is farthest from the mean and consequently had the highest inverse similarity measure. Finally, the field values with highest inverse similarity measure values are recommended as anomalous.

Frequency similarity measure identifies anomalous field values using frequency counts of the unique field values in a particular field of the fielded dataset. Typically, in a field of a fielded dataset, unique values occur multiple times. If a particular field value occurs only once or a very few times, then most likely it is an anomaly. For example, if field values and their corresponding frequency of occurrences in a particular input field are: "J.P. Morgan" (135), "Goldman Sachs" (183), "Citi" (216), "Morgan Stanley" (126), "City" (1). The anomalous field value is "City", which is the least frequent value with a frequency of occurrence of "1".

Figure 2B:
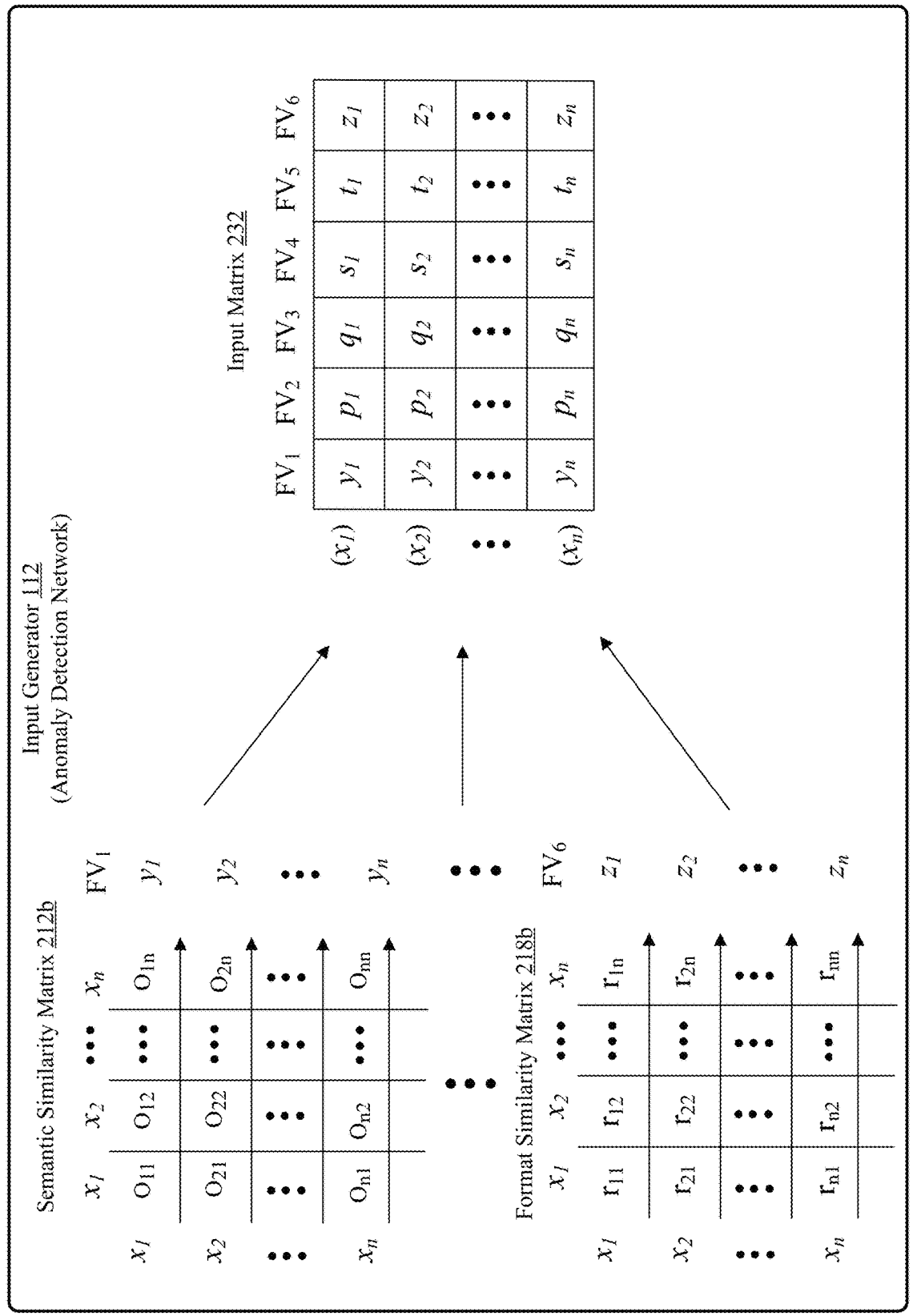
FIG. 2B shows calculations for determining factor vectors using two example similarity measures to generate an input matrix.

Turning to the example factor vector calculator 210 shown in FIG. 2A, the six similarity calculators generate six factor vectors 230 corresponding to the six similarity measures. The six factor vectors are denoted by the variables "y", "p", "q", "s", "t", and "z" respectively. Each factor comprises as many elements as unique field values in a field of the fielded dataset. As shown in the example dataset 202, there are "n" unique field values: $x_1$ to $x_n$ in a field. Each field value is also referred to as a word, word phrase or a token. Each of the six factor vectors 230 consists of "n" values or elements. For example, the first factor vector consists of the values $y_1$ to $y_n$, the second factor vector consists of the values $p_1$ to $p_n$, the third factor vector consists of the values $q_1$ to $q_n$, the fourth factor vector consists of the values $s_1$ to $s_n$, the fifth factor vector consists of the values $t_1$ to $t_n$ and the sixth factor vector consists of the values $z_1$ to $z_n$. When arranged column-wise, the six example factor vectors 230 shown in FIG. 2A form an input matrix which is shown in FIG. 2B referred to by a numeral 232. The input matrix 232 is given as input to the anomaly detection network 114 by the input generator 112.

FIG. 2B shows further details of how factor vectors are calculated for similarity measures listed above. In FIG. 2B factor vector calculations of two similarity measures are shown as an example. A person skilled in the art will appreciate that other factor vectors may be calculated similarly, either using matrix multiplications or scalar interactions. The examples shown in FIG. 2B rely on matrix multiplications.

The first similarity matrix 212b is for semantic similarity measure. It is a n×n matrix where n is the number of unique field values in a field of the fielded dataset. An inner product (also referred to as a dot product) is calculated between word embedding vector of each unique field value in the field with word embedding vector of every other unique field value in the same field of the fielded dataset. These embedding vectors are generated by either Word2Vec word embedding space, GloVe word embedding space, WordNet or any other low dimensional embedding space. The inner product between the word embedding vectors of two unique field values produces scalar values which are represented by variable $O_{ab}$ where "a" is the row index and "b" is the column index of the semantic similarity matrix 212b. The elements of the factor vector are row averages of corresponding rows of the similarity matrix. For example, value of the element $y_1$ of a factor vector FV1 is calculated by taking average of all the values in the first row of the semantic similarity matrix 212b i.e., $O_{11}$ to $O_{1n}$. The factor vector $FV_1$ is composed of elements $y_1$ to $y_n$ each of which is calculated by performing similar row average operations on corresponding rows of the similarity matrix.

Accordingly, similarity matrices are calculated for other similarity measures. FIG. 2B shows calculation of factor vector $FV_6$ using format similarity matrix 218b. For some similarity measures such as semantic and syntactical similarity, dot products or inner products of vector representations of unique field values of each field in the fielded dataset are calculated with every other unique field value in the same field of the fielded dataset to generate scalars. Row averages or weighted row averages of scalars are used to calculate values of the elements of the factor vectors. For other similarity measures such as soundex and format similarity measures, scalar values are generated by comparing every unique field value in a field with every other unique field value in the same field of the fielded dataset using various underlying algorithms. The scalar values are arranged in n×n matrices. The factor vector values are calculated in the same manner as above by taking row averages or weighted row averages of the scalars in corresponding rows of the similarity matrix. For some similarity measures, n×n matrices are not generated, rather Z-score for each unique field value in a particular field is calculated and used as elements in the respective factor vector. Examples of such similarity measures include length and frequency of occurrence similarity measures as explained above.

The factor vectors for all similarity measures are arranged column-wise to generate an input matrix 232. The input matrix 232 in FIG. 2B has six factor vectors $FV_1$ to $FV_6$ corresponding to six similarity measures described above. Each row of the input matrix 232 corresponds to a unique field value in a particular field of the fielded dataset 202. Intuitively, an element of a factor vector for a given similarity measure specifies a likelihood that a corresponding unique field value in a field of the fielded dataset is anomalous in a context of the given similarity measure and conditioned on respective similarity measure values of other unique field values in the particular field of the fielded dataset for the given similarity measure.

A row of the input matrix 232 represents a vector that encodes a likelihood that a corresponding unique field value in a particular field of the fielded dataset is anomalous in a context of the plurality of similarity measures and conditionable on respective similarity measure values of other unique field values of the particular of the fielded dataset for the plurality of linguistic similarity measures.

Figure 3:
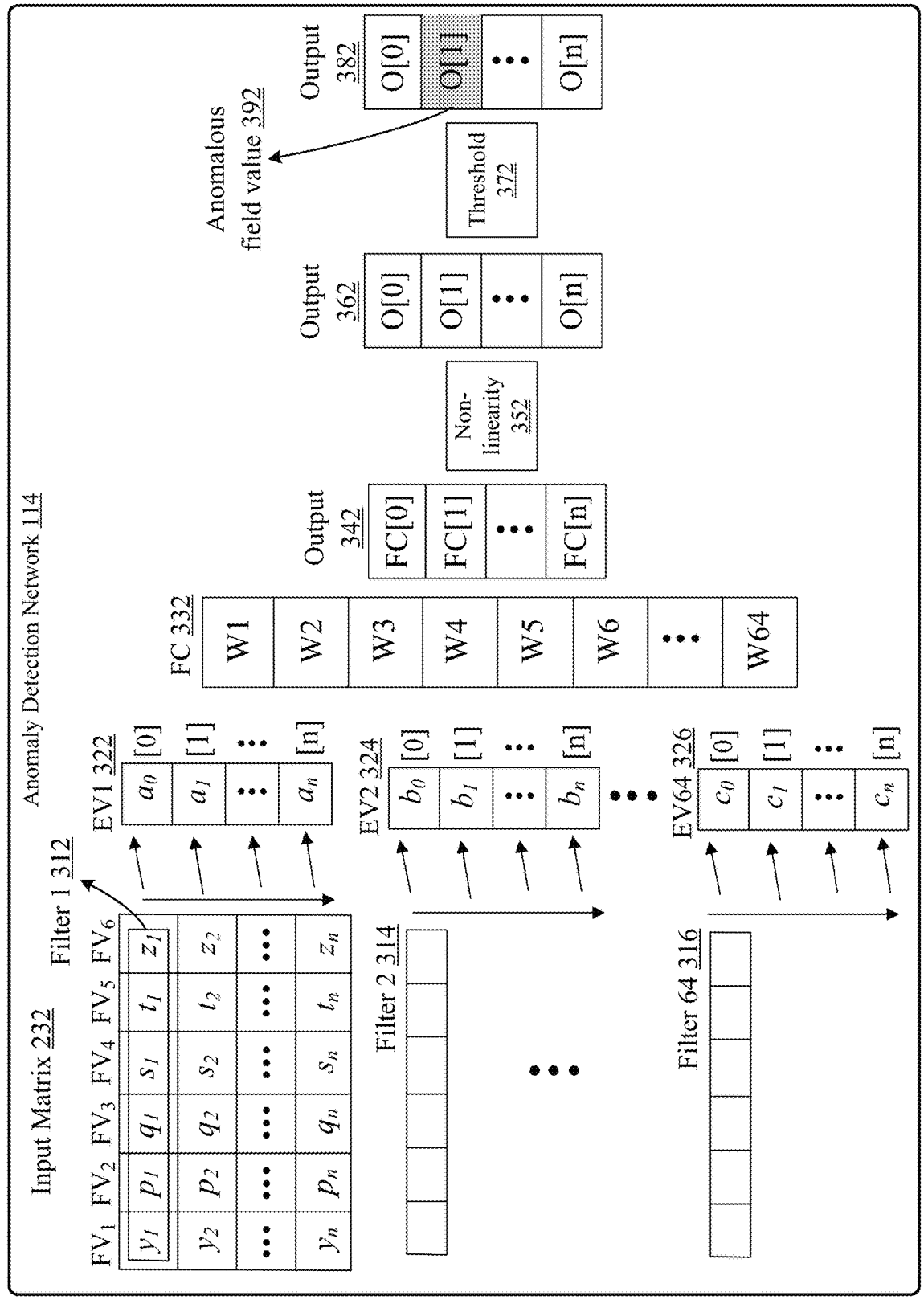
FIG. 3 shows processing of the input matrix of FIG. 2B by anomaly detection network of FIG. 1 to identify anomalous field values.

FIG. 3 illustrates processing of the input matrix 232 by convolutional neural network (CNN) of the anomaly detection network 114. The CNN can be a one-layer network or a two-layer network depending on the implementation. In a one-layer CNN, one set of filters are applied to the input matrix 232. In a two-layer CNN, two sets of filters are applied to the input matrix 232. A person skilled in the art will appreciate that additional layers can be added to the CNN. In the first step, 64 filters are row-wise convolved over the input matrix 232. A row-wise convolution of a filter on the input matrix 232 results in an evaluation vector (also referred to as a feature map). Note that the size of the filter is 1×k where k is the number of similarity measures.

For example, filter 1 312 in FIG. 3 is convolved over the first row ($y_1$, $p_1$, $q_1$, $s_1$, $t_1$, $z_1$) of the input matrix 232 to generate a scalar "$a_0$" at index position "0" of the evaluation vector EV1 322. Convolving the filter 1, 312 over second row ($y_2$, $p_2$, $q_2$, $s_2$, $t_2$, $z_2$) of the input matrix 232 generates a scalar "$a_1$" at index position "1" of the evaluation vector EV1 322. The same process is followed to generate scalars up to "$a_n$" in evaluation vector EV1 322 corresponding to "n" rows in the input matrix 232. A second evaluation vector EV2 324 is generated by row-wise convolving a filter 2 314 over the input matrix 232. The result of this convolution are scalars "$b_0$" to "$b_n$" in evaluation vector EV2 324. Sixty four (64) evaluation vectors (or feature maps) EV1 322 to EV64 326 are generated by convolving sixty four filters, filter 1 312 to filter 64 316 over the input matrix 232. The evaluation vectors EV1 322 to EV64 326 are provided as input to a fully connected (FC) neural network 332 to accumulate element-wise weighted sums of the evaluation vectors (feature maps) in an output vector 342. For example, the first element FC[0] of the output vector 342 is calculated as weighted sums of corresponding elements in all of the evaluation vectors (feature maps) i.e. W1.EV1[0]+W2.EV2[0]+ . . . + W64.EV64[0]. The output vector 342 has "n" elements corresponding to the "n" rows of the input matrix 232.

A nonlinearity function 352 is applied to the output vector 342 to produce a normalized output vector 362. Examples of nonlinearity functions include sigmoid, hyperbolic tangent (tanh), rectified linear unit (ReLU) and leaky ReLU. A threshold 372 is applied to the normalized output vector 362 to determine anomalous data values. In the anomaly detection network 114, the elements of the output vector 382 represent inverse similarity of corresponding field values in a given field of the fielded dataset. The higher the value of an element of the output vector 382, the higher the likelihood that corresponding field value in the particular field is anomalous. For example, as shown in FIG. 3, the second element O[1] 392 in the output vector 382 is above the threshold 372. Therefore, the second field value ($x_2$) of the particular field in the dataset 202 is identified as anomalous by the anomaly detection network 114.

Having described the operation of the anomaly detection network 114 in FIG. 3, we now describe the training of the FC neural network 332. In FIG. 3, a forward pass of the anomaly detection network 114 is illustrated. During training, the results of the output vector 382 are compared with ground truth. For example, the anomalous field value $x_2$ (corresponding to O[1] 392) is compared with the correct field value to determine whether the anomaly detection network correctly identified the anomalous word token in the field. In anomaly detection network, two cost functions are used to update the weights in the fully connected neural network FC 332. The reason for using two cost functions is to avoid the anomaly detection network 114 from moving towards a everything-non-anomaly solution since anomalies are a small portion of a typical field of the fielded dataset. An additional benefit of using two cost functions is to use different learning rates to achieve a balance between anomaly and non-anomaly detection. This results in more accurate detection of anomalous field values as anomalous as well as more accurate detection of non-anomalous field values as non-anomalous.

The training data for the anomaly detection network 114 is automatically generated by constructing positive and negative examples for inclusion in the training database 142. For each linguistic similarity measure a first set of field values are identified from a vocabulary which are similar to each other. A second set of field values are identified from the vocabulary that are dissimilar to each of the field values in the first set and the field values selected so far in the second set. The training dataset for the given linguistic similarity measure is generated by randomly selecting some field values from the first and second sets as positive and negative examples respectively. This process is repeated for the five linguistic similarity measures described above: semantic similarity, syntactical similarity, soundex similarity, length similarity and format similarity. For frequency similarity, the system randomly multiplies each of the unique input field value to increase its frequency of occurrence in the particular field of the fielded dataset.

Figure 4A:
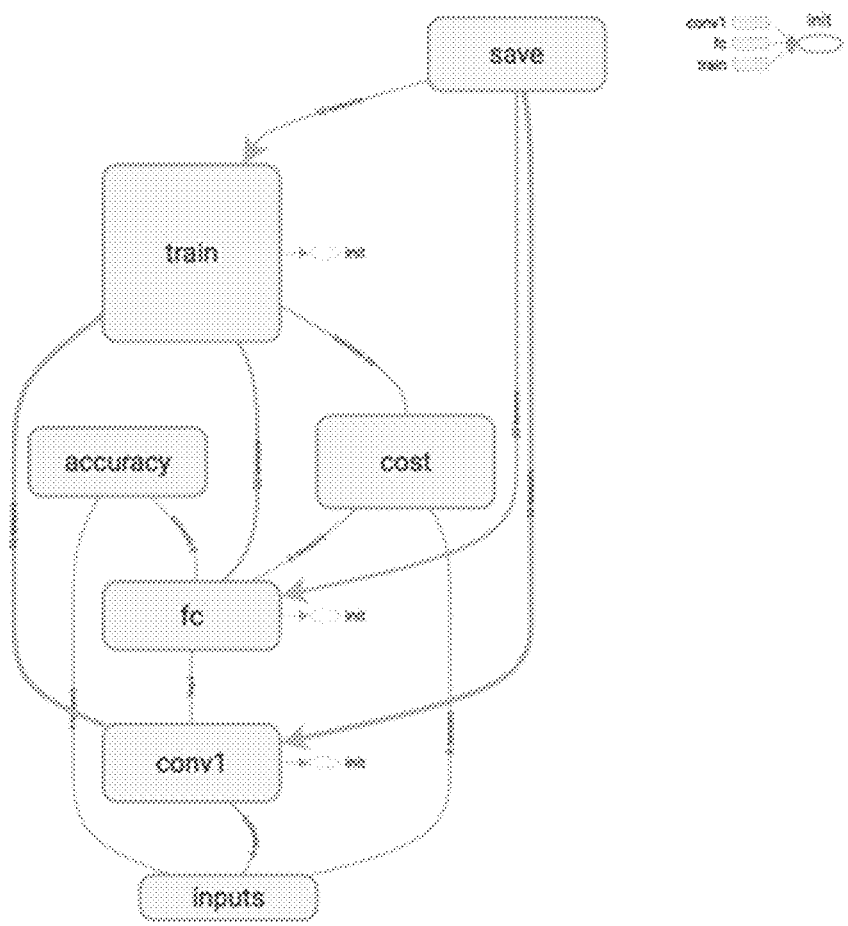
FIG. 4A shows examples of main components of a one-layer anomaly detection network.
Figure 4B:
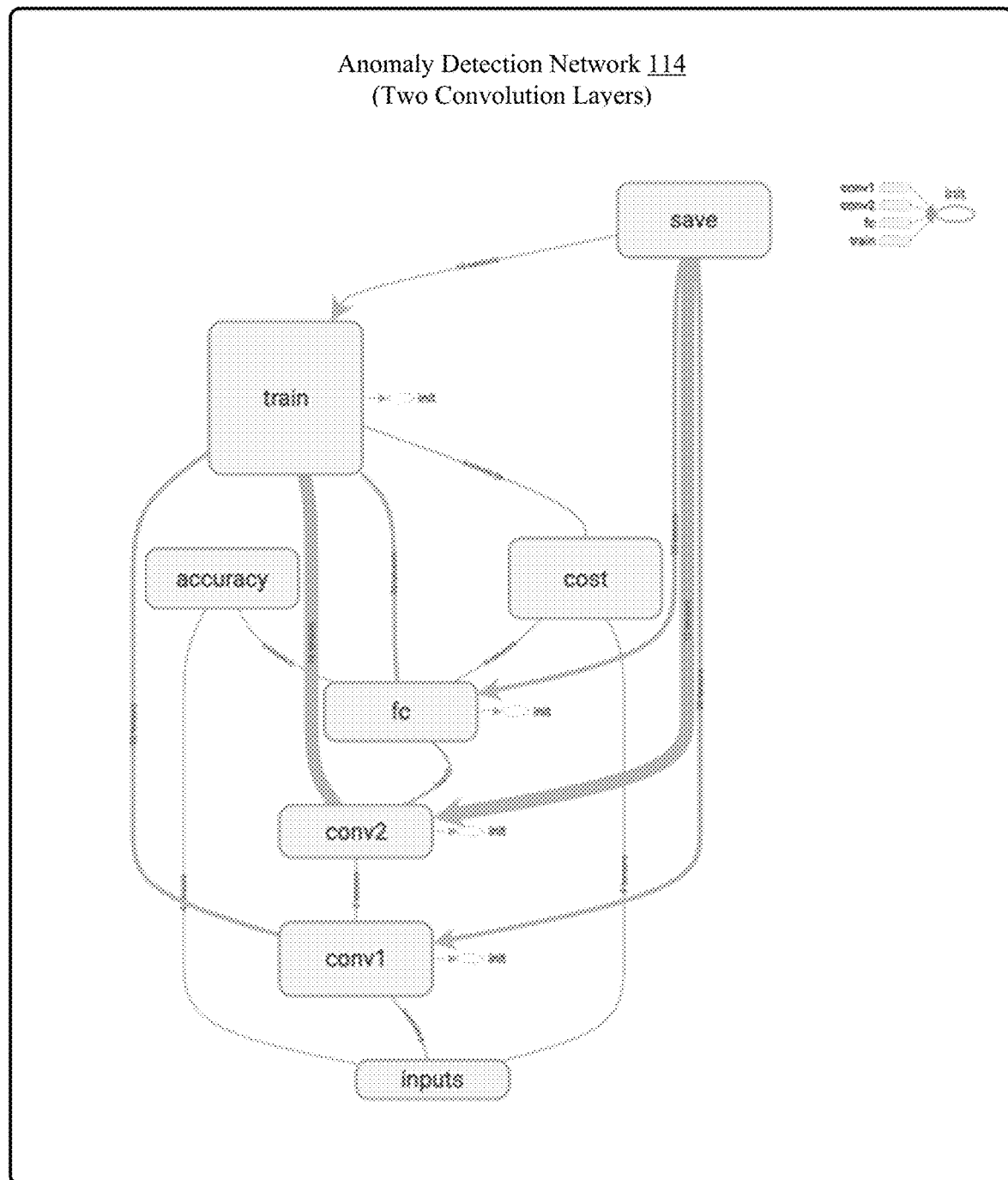
FIG. 4B shows examples of main components of a two-layer anomaly detection network.

FIG. 4A shows a high level view of an anomaly detection network 114 with one convolution layer while FIG. 4B shows the same with two convolution layers.

Suggestion Network

Figure 5A:
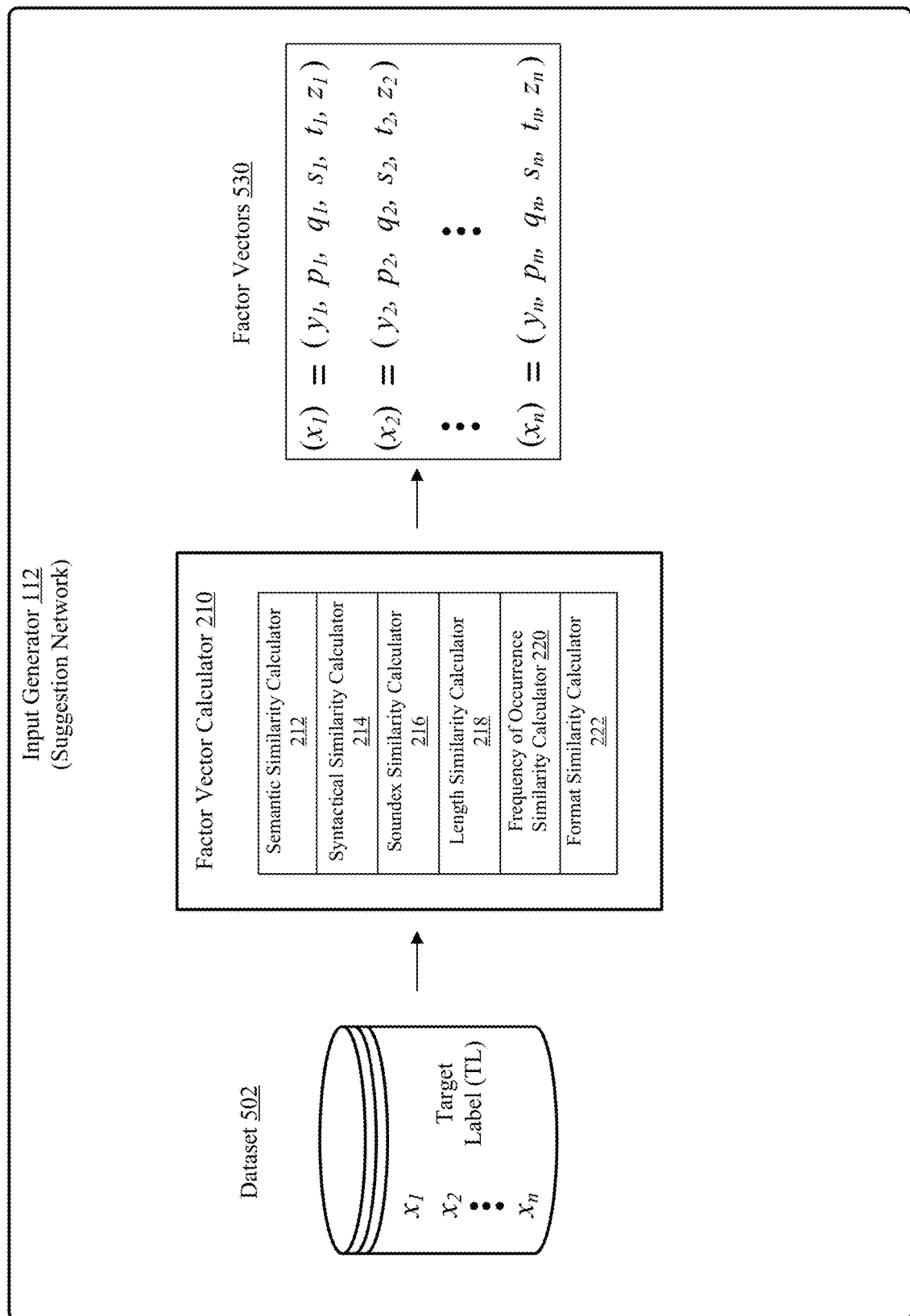
FIG. 5A is an example of an input generator for suggestion network of FIG. 1 using six similarity calculators.

FIG. 5A illustrates operation of the input generator 112 to generate input data for suggestion network 116. The input generator 112 takes a dataset 502 as input. During training the dataset 502 is generated from the training database 142 and during production, the dataset 502 is generated from the testing database 144. The dataset 502 is composed of field values. In the more common use case, these values are word tokens. In other implementations, these can be character tokens or phrase tokens. An example of a word token is "John" and an example of a phrase token is "J. P. Morgan". The dataset 202 is a fielded dataset which means it can have fields such as "First Name", "Last Name", "Company Name", "Country" etc., and data is organized as field values in the fields.

As opposed to the input dataset 202 for the anomaly detection network 114, the input dataset 502 contains field values $x_1$ to $x_n$ that are non-anomalous. In one implementation, the input dataset 502 contain the field values that have been processed by the anomaly detection network 114. The anomalous values have been identified and removed from the input dataset 502. In addition to the "n" non-anomalous field values $x_1$ to $x_n$ in a field, the input dataset 502 also contains an input value also referred to as a target label (TL). The suggestion network 116 suggests one or more unique field values from the "n" non-anomalous field values to replace the target label (TL).

As described above for the anomaly detection network 114, the input generator 112, generates factor vectors 530 for a plurality of similarity measures (also referred to as linguistic similarity measures) for the suggestion network 116. Suggestion network 116 uses the same six similarity measures as anomaly detection network 114: semantic similarity, syntactic similarity, soundex similarity, format similarity, length similarity, and frequency similarity. A factor vector calculator 210 contains similarity measure calculators for each of the similarity measures. FIG. 2A shows six similarity measure calculators corresponding to six similarity measure listed above. The calculations of similarity measures is the same as explained above in the anomaly detection network 114. The semantic similarity calculator 212 calculates semantic similarity measure, the syntactical similarity calculator 214 calculates syntactical similarity measure, the soundex similarity calculator 216 calculates soundex similarity measure, the length similarity calculator 218 calculates length similarity measure, the frequency of occurrence similarity calculator 220 calculates frequency similarity measure and the format similarity measure calculator 222 calculates format similarity measure.

In case of anomaly detection network 114, similarity measures are calculated for every unique field value with every other unique field value in a particular field of the fielded dataset. In suggestion network 116, similarity measures are calculated for each unique input field value with the target label (TL). In anomaly detection network 114, the most dissimilar input field value is recommended as anomalous. In suggestion network 116, the most similar input field value (to the target label) is recommended to replace the target label. In another implementation, more than one similar input field values are recommended as replacement values for the target label. Further evaluation of the recommended input field values is performed by an expert to select one unique field value to replace the target label.

Figure 5B:
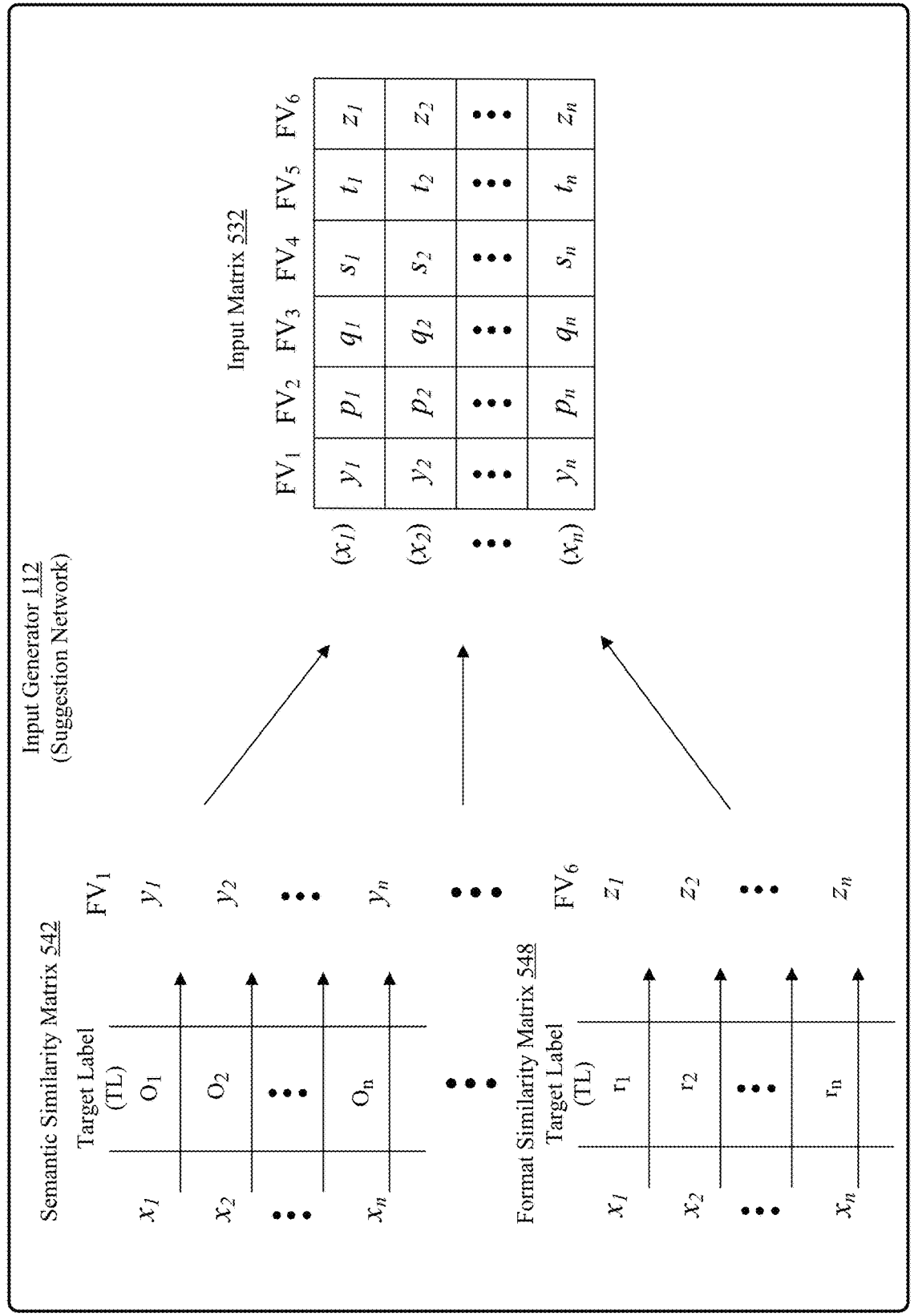
FIG. 5B shows calculations for determining factor vectors using two example similarity measures to generate an input matrix.

Turning to the example factor vector calculator 210 shown in FIG. 5A, the six similarity calculators generate six factor vectors 530 corresponding to the six similarity measures. The six factor vectors are denoted by the variables "y", "p", "q", "s", "t", and "z". Each factor comprises as many elements as words in a field of the fielded dataset. As shown in the example dataset 502, there are "n" words $x_1$ to $x_n$ in a field. Each word is also referred to as a field value. Each of the six factor vectors 530 consists of "n" values. For example, the first factor vector consists of the values $y_1$ to $y_n$ the second factor vector consists of the values $p_1$ to $p_n$, the third factor vector consists of the values $q_1$ to $q_n$, the fourth factor vector consists of the values $s_1$ to $s_n$, the fifth factor vector consists of the values $t_1$ to $t_n$ and the sixth factor vector consists of the values $z_1$ to $z_n$. When arranged column-wise, the six example factor vectors 530 shown in FIG. 5A form an input matrix which is shown in FIG. 5B referred to by a numeral 532. The input matrix 532 is given as input to the suggestion network 116 by the input generator 112.

FIG. 5B shows further details of how factor vectors are calculated for similarity measures listed above. In FIG. 5B, factor vector calculations of two similarity measures are shown as an example. As opposed to the anomaly detection network 114, for the suggestion network 116, the semantic similarity matrix 542 and format similarity matrix 548 compare only the target label (TL) with the input field values $x_1$ to $x_n$. A person skilled in the art will appreciate that other factor vectors may be calculated similarly either using matrix multiplications or scalar interactions. The examples shown in FIG. 5B rely on matrix multiplications.

The first similarity matrix 542 is for calculation of semantic similarity measure. It is an n×1 matrix where n is the number of unique field values in a field in the fielded dataset. An inner product (also referred to as a dot product) is calculated between word embedding vector of each unique field value in the field with word embedding vector of target label. These embedding vectors are provided by either Word2Vec word embedding space, GloVe word embedding space, WordNet or any other low dimensional embedding space. The inner product between the word embedding vectors of two unique field values produces scalar values which are represented by variable $O_a$ where "a" is the row index of the semantic similarity matrix 542. The elements of the factor vector correspond to the rows of the similarity matrix. For example, value of the element $y_1$ of a factor vector FV1 is equal to $O_1$. The factor vector FV1 is composed of elements $y_1$ to $y_n$ each of which is calculated by performing similar row operations on corresponding rows of the similarity matrix.

Accordingly, similarity matrices are calculated for other similarity measures. For some similarity measures such as semantic and syntactical similarity, dot products or inner products of vector representations of field values of each field in the fielded dataset are calculated with target label to generate scalars. Factor vectors are generated using the row values in similarity matrices. For other similarity measures such as soundex and format similarity measures, scalar values are generated by comparing every field value in a field with the target label using various underlying algorithms. The scalar values are arranged in n×1 matrices. The factor vector values are calculated in the same manner as above by using values of the scalars in corresponding rows of the similarity matrix. For some other similarity measures, n×1 matrices are not generated, rather Z-score for each field value in a field is calculated and used as elements in the corresponding factor vector. Examples of such similarity measures include length and frequency of occurrence similarity measures.

The factor vectors for all similarity measures are arranged column-wise to generate an input matrix 532. The input matrix 532 in FIG. 5B has six factor vectors $FV_1$ to $FV_6$ corresponding to six similarity measures described above. Each row of the input matrix 532 corresponds to a field value in a field of the fielded dataset 202. Intuitively, an element of the factor vector for the given similarity measure specifies a likelihood that a corresponding unique field value in the dataset is similar to the target label in a context of the given similarity measure and conditioned on respective similarity measure values of other unique field values in the dataset for the given similarity measure.

A row of the input matrix represents a vector that encodes a likelihood that a corresponding unique field value in the dataset is similar to the target label in a context of the plurality of linguistic similarity measures and conditionable on respective similarity measure values of other unique field values in the dataset for the plurality of linguistic similarity measures.

Figure 6:
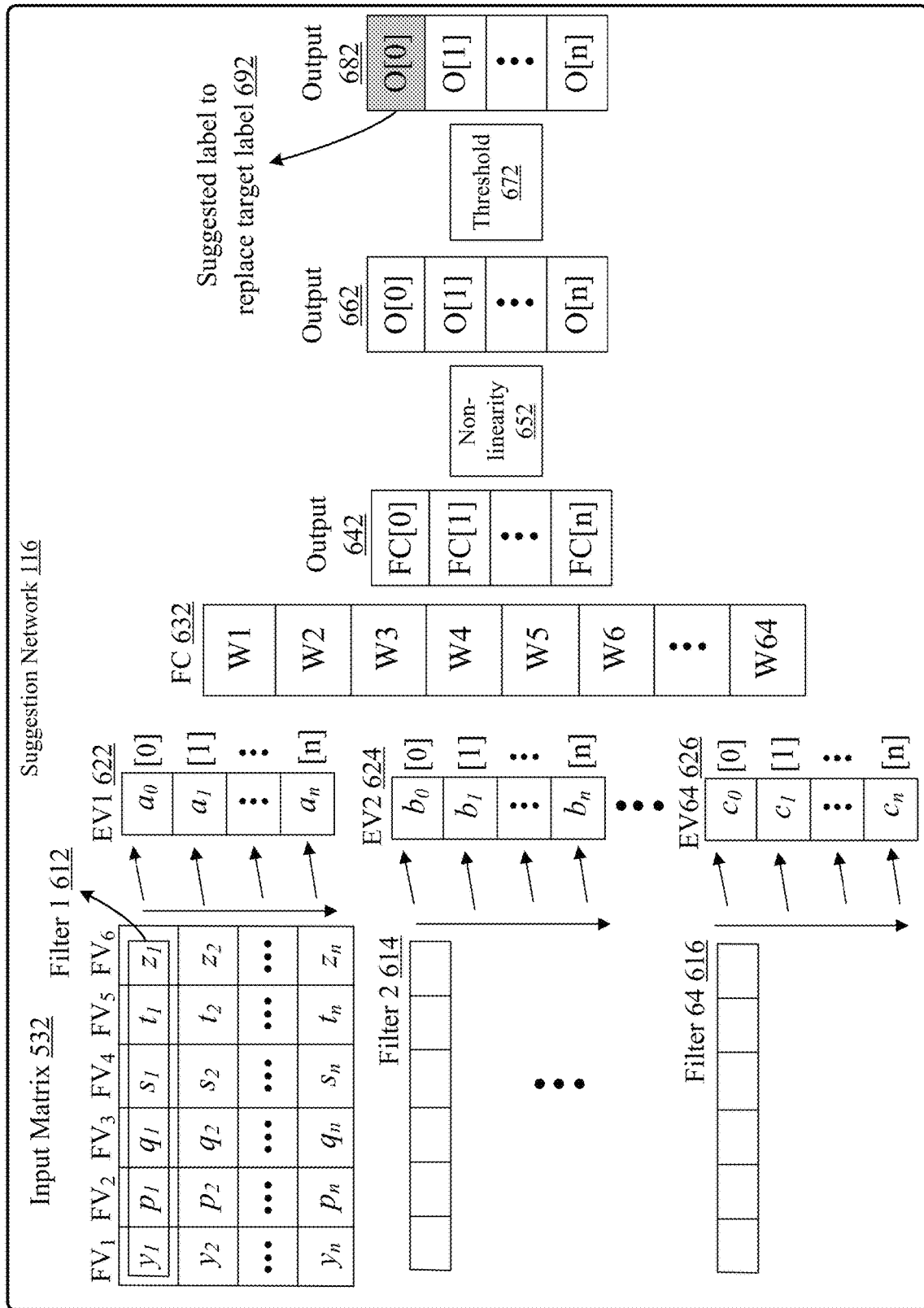
FIG. 6 shows processing of the input matrix of FIG. 5B by suggestion network of FIG. 1 to suggest correct field value for the anomalous field value.

FIG. 6 illustrates processing of the input matrix 532 by convolutional neural network (CNN) of the suggestion network 116. The CNN is a one-layer network. In a one-layer CNN, one set of filters are applied to the input matrix 532. A person skilled in the art will appreciate that additional layers can be added to the CNN. In the first step, 64 filters are row-wise convolved over the input matrix 532. A row-wise convolution of a filter on the input matrix 532 results in an evaluation vector (also referred to as a feature map). For example, filter 1 612 in FIG. 6 is convolved over the first row ($y_1$, $p_1$, $q_1$, $s_1$, $t_1$, $z_1$) of the input matrix 532 to generate a scalar "$a_0$" at index position "0" of the evaluation vector EV1 622. Convolving the filter 1, 612 over second row ($y_2$, $p_2$, $q_2$, $s_2$, $t_2$, $z_2$) of the input matrix 532 generates a scalar "$a_1$" at index position "1" of the evaluation vector EV1. The same process is followed to generate scalars up to "$a_n$" in evaluation vector EV1 corresponding to "n" rows in the input matrix 532. A second evaluation vector EV2 624 is generated by row-wise convolving a filter 2 614 over the input matrix 532. The result of this convolution are scalars "$b_0$" to "$b_n$" in evaluation vector EV2 624. Sixty four (64) evaluation vectors (or feature maps) EV1 622 to EV64 626 are generated by convolving sixty four filters, filter 1 612 to filter 64 616 over the input matrix 532. The evaluation vectors EV1 622 to EV64 626 are provided as input to a fully connected (FC) neural network 632 to accumulate element-wise weighted sums of the evaluation vectors (feature maps) in an output vector 642. For example, the first element FC[0] of the output vector 642 is calculated as weighted sums of corresponding elements in all of the evaluation vectors (feature maps) i.e. W1.EV1[0]+W2.EV2[0]+ . . . + W64.EV64[0]. The output vector 642 has "n" elements corresponding to the "n" rows of the input matrix 532.

A nonlinearity function 652 is applied to the output vector 642 to produce a normalized output vector 662. Examples of nonlinearity functions include sigmoid, hyperbolic tangent (tanh), rectified linear unit (ReLU) and leaky ReLU. A threshold 672 is applied to the normalized output vector 662 to determine similar data values. In suggestion network 116, the elements of the output vector 682 represent similarity of corresponding field values in a given input field of the fielded dataset to the target label. The higher the value of an element of the output vector 682, the higher the likelihood that corresponding field values in the input field is similar to the target label. For example, as shown in FIG. 6, the first element in the output vector is above the threshold 672. Therefore, this element ($x_1$) of the input field in the dataset 502 is recommended by the suggestion network as a replacement for target label. In another implementation multiple input field values can be recommended by the suggestion network 116. An expert can select one input field value from the suggested values to replace the target label.

Having described the operation of the suggestion network 116 in FIG. 6, we now describe the training of the FC neural network 632. In FIG. 6, a forward pass of the suggestion network 116 is described. During training, the results of the output vector 682 are compared with ground truth. For example, the suggested field value 682 is compared with the correct value to determine whether the suggestion network correctly identified the replacement field value in the field. In suggestion network 116, one cost function is used to update the weights in the fully connected neural network FC 632. For example, as shown in FIG. 6, the first element O[0] 692 in the output vector 682 is above the threshold 372. Therefore, the first field value ($x_1$) of the particular field in the dataset 502 is used to replace the anomalous input field or the target label (TL) by the suggestion network 116.

The training data for the suggestion network 116 is automatically generated by constructing positive and negative examples for inclusion in the training dataset. For each linguistic similarity measure a first set of field values are identified from a vocabulary which are similar to each other. A second set of field values are also identified from the vocabulary that are dissimilar to each of the field values in the first set and the field values selected so far in the second set. The training dataset for the given linguistic similarity measure is generated by randomly selecting some field values from the first and second sets as positive and negative examples respectively. This process is repeated for the five linguistic similarity measures described above: semantic similarity, syntactical similarity, soundex similarity, length similarity and format similarity. For frequency similarity, the system randomly multiplies each of the unique field value to increase its frequency of occurrence in the particular field of the fielded dataset. A target label is randomly selected from a set of anomalous data values.

Figure 7:
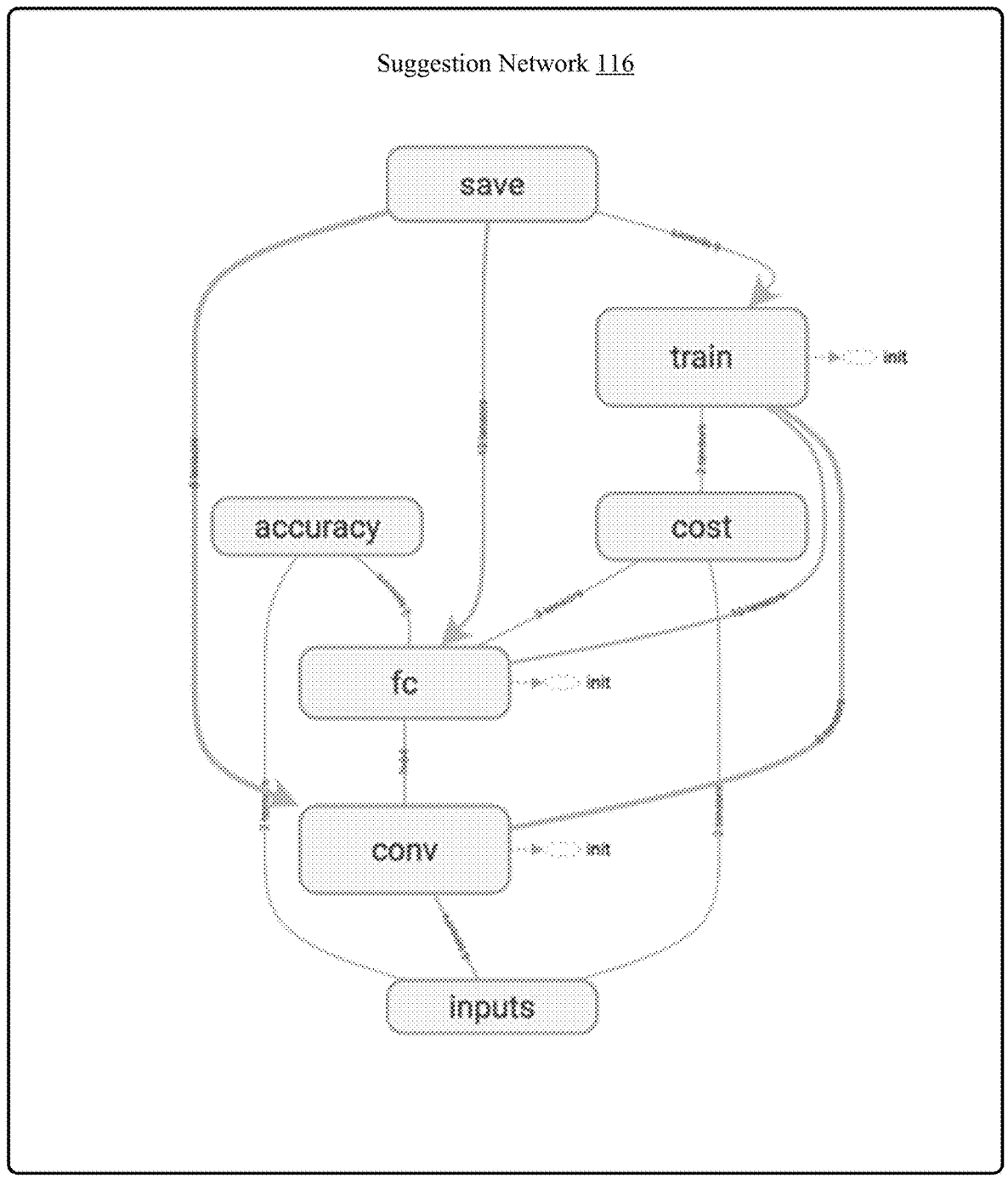
FIG. 7 shows examples of main components of a one-layer suggestion network of FIG. 1.

FIG. 7 shows a high level view of a suggestion network 116 with one convolution layer.

Computer System

Figure 8:
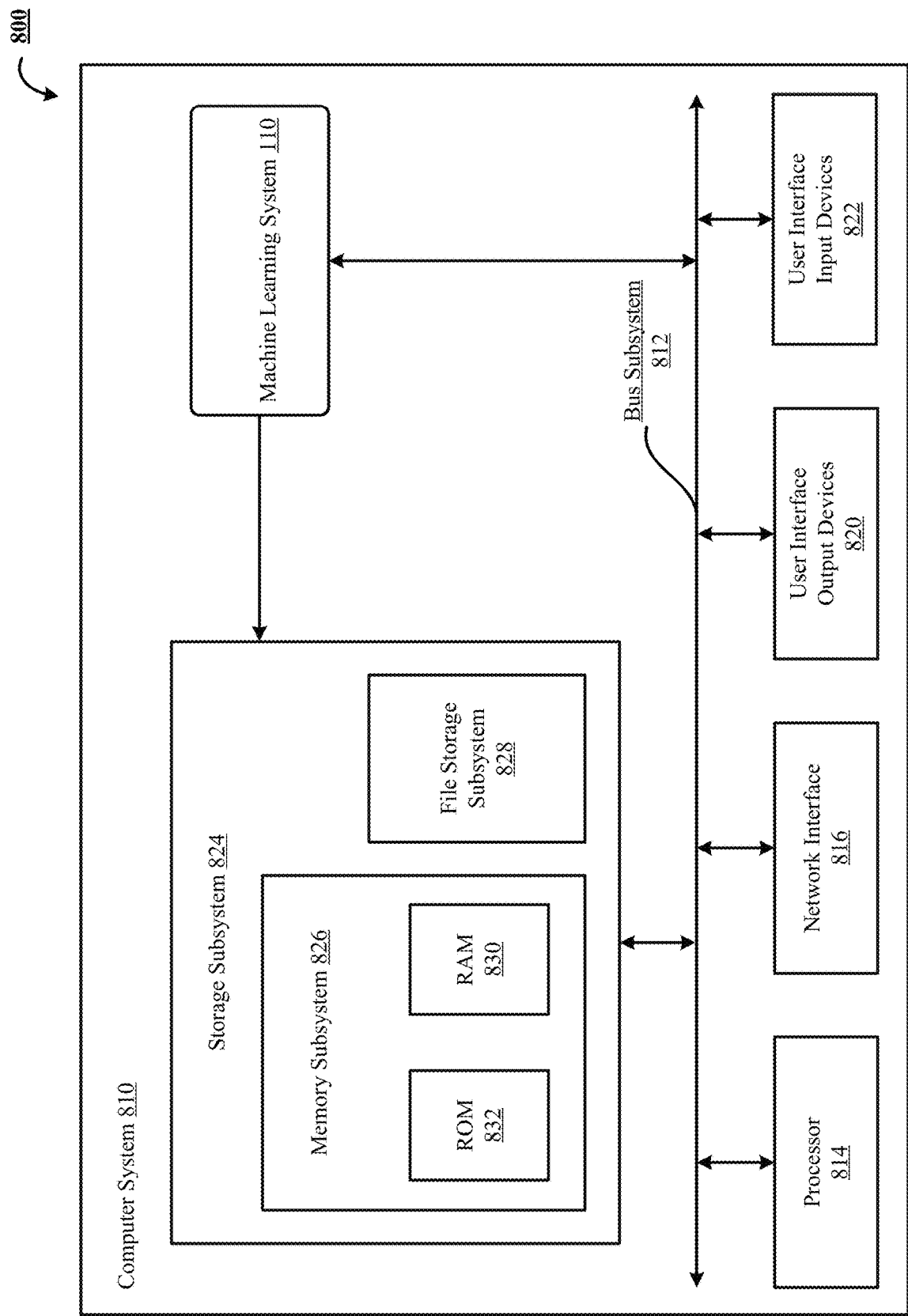
FIG. 8 is a simplified block diagram of a computer system that can be used to implement the machine learning system of FIG. 1.

FIG. 8 is a simplified block diagram 800 of a computer system 810 that can be used to implement the machine learning system 110. Computer system 810 typically includes at least one processor 814 that communicates with a number of peripheral devices via bus subsystem 812. These peripheral devices can include a storage subsystem 824 including, for example, memory devices and a file storage subsystem, user interface input devices 822, user interface output devices 820, and a network interface subsystem 816. The input and output devices allow user interaction with computer system 810. Network interface subsystem 816 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 820 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory subsystem 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem can use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

Particular Implementations

Anomaly Detection Network

The technology disclosed relates to detection of anomalous field values for a particular field in a fielded dataset.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A first system implementation of the technology disclosed includes one or more processors coupled to the memory. The memory is loaded with computer instructions to detect an anomalous field value. The system determines which field values for a particular field in a fielded dataset are anomalous. The system compares a particular unique field value to the other unique field values for the particular field by applying a plurality of similarity measures and generates a factor vector that has one scalar for each of the unique field values. The system then compares the factor vector using convolution filters in a convolutional neural network (abbreviated CNN) to generate evaluation vectors (also referred to as feature maps). The system further evaluates the evaluation vectors using a fully connected (abbreviated FC) neural network to produce an anomaly scalar for the particular unique field value. A threshold is applied to the anomaly scalar to determine whether the particular unique field value is anomalous.

This system implementation and other systems disclosed optionally include one or more of the following features.

System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system uses a plurality of similarity measures including semantic similarity, syntactic similarity, soundex similarity, character-by-character format similarity, field length similarity, and dataset frequency similarity.

The system further includes determining that one or more field values in the fielded dataset are similar to an input value (also referred to as a target label) for a particular field. The system compares a particular input value to the unique field values for the particular input field by applying a plurality of similarity measures. This results in generation of a factor vector that has one scalar for each of the unique field values. The system evaluates the factor vector using the convolution filters in the CNN to generate evaluation vectors (also referred to as feature maps) for similarity to the unique field values. The system uses the suggestion scalars to determine one or more suggestion candidates for the particular input value.

The system includes calculating factor vectors for some of the similarity measures by calculating an inner product between respective similarity measure values of the unique field values in the dataset to form a similarity matrix. A row-wise average of the inner product results in the similarity matrix is calculated. A factor vector is formulated for the given similarity measure by arranging the row-wise averages as elements of the factor vector.

An element of the factor vector the given linguistic similarity measure specifies a likelihood that a corresponding unique field value in the dataset is anomalous in a context of the given linguistic similarity measure. Additionally, the element of the factor vector is also conditioned on respective similarity measure values of other unique values in the dataset for the given linguistic similarity measure.

The system generates an input for the convolutional neural network (abbreviated CNN) by column-wise arranging the factor vectors in an input matrix. In such an implementation, the convolution filters apply row-wise on the input matrix. Further, in such an implementation, a row in the input matrix represents a vector that encodes a likelihood that a corresponding unique field value in the dataset is anomalous in a context of the plurality of linguistic similarity measures and conditionable on respective similarity measure values of other unique field values in the dataset for the plurality of linguistic similarity measures.

The system automatically constructs positive and negative examples for inclusion in a training dataset. For a given linguistic similarity measure, the system constructs the training dataset by determining a first set of similar field values from a vocabulary and determines a second set of dissimilar field values from the vocabulary. The system then randomly selects some field values from the first set as positive examples and the second set as negative examples respectively. The system repeats the above process for each linguistic similarity measure to determine and select positive and negative training examples. The system stores the randomly selected field values for the plurality of similarity measures as the training dataset.

The system trains the convolutional neural network (CNN) and the fully connected (FC) neural network using the positive and negative examples in the training dataset.

The system uses at least two cost functions to evaluate performance of the CNN and the FC neural network during training. A first cost function evaluates classification of unique field values as anomalies and a second cost function evaluates classification of unique field values as non-anomalies. In such an implementation, the system calculates separate gradients for the two cost functions and back propagates the gradients to the CNN and the FC neural network during training.

In one implementation of the system, the convolutional neural network (CNN) is a one-layer CNN. In another implementation of the system, the convolutional neural network is a two-layer CNN.

A second system implementation of the technology disclosed includes one or more processors coupled to the memory. The memory is loaded with computer instructions to detect linguistically anomalous field values in a dataset. The system calculates at least one factor vector for each of a plurality of linguistic similarity measures. For each linguistic similarity measure, the system calculates its factor vector by averaging product results and/or distribution values calculated from similarity measure values of unique field values in the dataset for the given linguistic similarity measure. The factor vectors are provided as input to a convolutional neural network (abbreviated CNN). The system applies convolution filters to the factor vectors to generate evaluation vectors (also referred to as feature maps). Following this, the system provides the evaluation vectors as input to a fully-connected (abbreviated FC) neural network to accumulate element-wise weighted sums of the evaluation vectors in an output vector. Following this, the system applies a nonlinearity function to the output vector to produce a normalized output vector. Finally, the system applies thresholding to the normalized output vector to identify anomalous and similar field values in the dataset.

Each of the features discussed in this particular implementation section for the first system implementation apply equally to the second system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A first method implementation of the technology disclosed includes detecting anomalous field values. The method includes, determining which field values for a particular field in a fielded dataset are anomalous. A particular unique field value is compared to other unique field values for the particular field by applying a plurality of similarity measures and generating a factor vector that has one scalar for each of the unique field values. The method then compares the factor vector using convolution filters in a convolutional neural network (abbreviated CNN) to generate evaluation vectors (also referred to as feature maps). The method further evaluates the evaluation vectors using a fully connected (abbreviated FC) neural network to produce an anomaly scalar for the particular unique field value. A threshold is applied to the anomaly scalar to determine whether the particular unique field value is anomalous.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the first system implementation apply equally to the CRM implementation. As indicated above, all the system features are not repeated here and should be considered repeated by reference.

A second method implementation of the technology disclosed includes detecting linguistically anomalous field values in a dataset. The method includes calculating at least one factor vector for each of a plurality of linguistic similarity measures. For a given linguistic similarity measure, the method calculates its factor vector by averaging product results and/or distribution values calculated from similarity measure values of unique field values in the dataset for the given linguistic similarity measure. The method includes providing the factor vectors as input to a convolutional neural network (abbreviated CNN) and applying convolution filters to the factor vectors to generate evaluation vectors (also referred to as feature maps). Following this, the method includes providing the evaluation vectors as input to a fully-connected (abbreviated FC) neural network to accumulate element-wise weighted sums of the evaluation vectors in an output vector. Following this, the method includes applying a nonlinearity function to the output vector to produce a normalized output vector. Finally, the method includes thresholding the normalized output vector to identify anomalous and similar field values in the dataset.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the method described above. Yet another implementation may include a system including memory and one or more processors operable to execute instructions, stored in the memory, to perform the method described above.

Computer readable media (CRM) implementations of the technology disclosed include a non-transitory computer readable storage medium impressed with computer program instructions, when executed on a processor, implement the second method described above.

Each of the features discussed in this particular implementation section for the first system implementation apply equally to the CRM implementation. As indicated above, all the system features are not repeated here and should be considered repeated by reference.

Suggestion Network

A third system implementation of the technology disclosed includes one or more processors coupled to the memory. The memory is loaded with computer instructions to suggest one or more candidates for a particular input value. The system determines that one or more field values in a set of field values are similar to an input value for a particular field in a fielded dataset. The system performs this determination by comparing a particular input value to unique field values for the particular field by applying a plurality of similarity measures and generating a factor vector that has one scalar for each of the unique field values. Following this, the system evaluates the factor vector using convolution filters in a convolutional neural network (CNN) to generate evaluation vectors (also referred to as feature maps) for similarity to the unique field values. The system further evaluates the evaluation vectors using a fully-connected (FC) neural network to produce suggestion scalars for similarity to the particular input value. Finally, the system uses the suggestion scalars to determine one or more suggestion candidates for the particular input value.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system uses a plurality of similarity measures including semantic similarity, syntactic similarity, soundex similarity, character-by-character format similarity, field length similarity, and dataset frequency similarity.

The system constructs an input to the CNN by column-wise arranging one or more factor vectors in an input matrix. In such an implementation, the convolution filters apply row-wise on the input matrix.

The system automatically constructs positive and negative examples for inclusion in a training dataset. For a given linguistic similarity measure, the system determines a first set of similar field values from a vocabulary and determines a second set of dissimilar field values from the vocabulary. Following this, the system randomly selects some field values from the first and second sets as positive and negative examples respectively. The system repeats the above process of determining the first set and the second set of field values for a plurality of similarity measures. Finally, the system stores the randomly selected field values for the plurality of similarity measures as the training dataset.

In such an implementation, the system further includes training the CNN and the FC neural network using the positive and negative examples in the training dataset.

The system uses at least one cost function to evaluate performance of the CNN and the FC neural network during training.

In one implementation of the system, the convolutional neural network (CNN) is a one-layer CNN. In another implementation of the system, the convolutional neural network (CNN) is a two-layer CNN.

Other implementations may include a non-transitory computer readable storage medium storing instructions executable by a processor to perform functions of the system described above. Yet another implementation may include a method performing the functions of the system described above.

In one implementation, the system includes, determining which field values for a particular field in the fielded dataset are anomalous. The system performs this determination by comparing a particular unique field value to other unique field values for the particular field by applying a plurality of similarity measures and generating a factor vector that has one scalar for each of the unique field values. Following this, the system evaluates the factor vector using the convolution filters in the CNN to generate evaluation vectors (also referred to as feature maps). The system further evaluates the evaluation vectors using the FC neural network to produce an anomaly scalar for the particular unique field value. Finally, the system applies thresholding to the anomaly scalar to determine whether the particular unique field value is anomalous.

A third method implementation of the technology disclosed includes suggesting one or more candidates for a particular input value. The method includes, determining that one or more field values in a set of field values are similar to an input value for a particular field in a fielded dataset. The method performs this determination by comparing a particular input value to unique field values for the particular field by applying a plurality of similarity measures and generating a factor vector that has one scalar for each of the unique field values. Following this, the method evaluates the factor vector using convolution filters in a convolutional neural network (CNN) to generate evaluation vectors (also referred to as feature maps) for similarity to the unique field values. The method further evaluates the evaluation vectors using a fully-connected (FC) neural network to produce suggestion scalars for similarity to the particular input value. Finally, the method uses the suggestion scalars to determine one or more suggestion candidates for the particular input value.

Each of the features discussed in this particular implementation section for the third system implementation apply equally to this method implementation. As indicated above, all the system features are not repeated here and should be considered repeated by reference.

Other implementations may include a non-transitory computer readable storage medium storing instructions executable by a processor to perform the third method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Each of the features discussed in this particular implementation section for the third system implementation apply equally to the CRM implementation. As indicated above, all the system features are not repeated here and should be considered repeated by reference.

The technology disclosed, and particularly the anomaly detection network 114 and the suggestion network 116, can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a BigTable™ compatible non-relational database implementation, or an HBase™ or DynamoDB™ compatible non-relational database implementation. In addition, the technology disclosed can be implemented using different programming models like MapReduce™, bulk synchronous programming, MPI primitives, etc., or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Overview

- Problem Space
- Scope of the Project
- Input Data (Real World Data vs Generated Data)
- Data Distribution and Challenges
- Proposed Approach
  - Representation
  - Machine Learning Model
- Result
  - Anomaly Detection
  - Suggestion
- Demo
- Going Forward

Problem Space

- More and more companies are using big data to help drive their business decision
- Data comes in all shape and sizes, so before data is consumed, it needs to be cleaned
    - data collection can be manual or automatic, misspelling, or variation of the same word can happen all the time
- Data Scientist typically spend more than 70% of the time cleaning the data before doing any data analysis
    - Writing scripts to trim, search/replace, look for anomalies, etc
    - Visual Data Cleaning solutions offered by Salesforce, Trifacta, Tableau etc really improved the process

Problem Space

- So what if we can make this process better, and clean the data for them?
- Or at a minimum give them suggestions on the ones that our model can recognize with high confidence? And improve the process through reinforced learning?

Scope of the Project

- Since the area is relatively new, our goal is to test out our model vs real world data and assess the approach
- In the project we are going to make some assumptions to scale down the problem so we can tackle in the limited time we are given
    - We are going to deal with English words only, and our problem space will be ASCII only (the same approach can be applied on different languages)
    - We are going to assume the list of entries are single words instead of a mix of words or sentences
    - Will be working with limited set of real data and substitute the gap with generated data (more on the next slide)
    - Suggestion will be reduced to classification, and will not recommending words that are not in the vector space

Input Data (Real World Data)

- Unlike dealing with other classification problems like images, which are widely available, having a large database of dirty data with expected result is extremely rare.
- The biggest challenge to the project is to actually finding dirty data and cleaning it manually to feed into the model to train.
    - All of the real world test data are grabbed from https://www.opendatanetwork.com and cleaned manually to feed into model for training
    - In most AI projects such as Image-Net, people around the world pool in the effort to help classify and clean, which is something we simply cannot tackle with limited size of resource and time
- This is not a problem for companies in this space, since customers are actively using their software to clean bad data and giving real feedbacks to the model

Input Data (Generated Data)

- So what to do with limited amount of data?
- Generation based on real data to train
    - Randomly pick words in the English dictionary and generate similar and dissimilar words to create a test vector and the expected result using some similarity function (more on this later)
- Test against real data which we cleaned manually to verify the approach
    - If we can show the trained model with generated data to do better than chance at cleaning real world data then it's a success
    - As we have more real data as a training set to help the model learn, the success rate will get better and better over time

Data Distribution and Challenges

Depending on the context, data can have different distribution models, for example:

- (nearly) Evenly Distributed, for example, categorical fields
    - Frequency doesn't give much hint
        - Evenly distributed data is clean?
- Decay-like Distribution
    - High Frequency Non-Anomaly vs. Low Frequency Anomaly
        - Frequency plays an important role
        - What should be considered? Semantic? Syntactic?
    - High Frequency Non-Anomaly vs. Low Frequency Non-Anomaly vs. Low Frequency Anomaly
        - More complicated
        - Frequency is still important, but what else?

Proposed Approach

- Computer Representation of the problem
    - With images and sounds, we can represent at the pixel and sampling level, for words it's not as straightforward
    - Taking a hint based approach to start
        - Semantic Similarity (word2vec, WordNet)
        - Syntax Cosine Similarity
        - Soundex
        - Length
        - Frequency
        - Format
- Machine Learning Model
    - Linear Regression
    - Convolutional Neural Network

Proposed Approach - Hint

- In some cases, looking at each hint alone doesn't make much sense to humans to figure out what's the anomaly or the proper suggestion
- This is fine, as the goal here is to let the computer to simply figure out the relationship between these hints and when/how to use them

Proposed Approach – Hint: Semantic Similarity

- Type of problem solved:
  - Anomaly
    - Given vector: ["United States", "US", "Canada", "Mexico", "Argentina", "VW", "Cnada"]
      Anomaly should be: ["VW", "Cnada"]
  - Suggestion
    - Given vector: ["United States", "Apple", "Orange", "Banana", "Fruits", "Car"]
      Given word "US" -> "United States"
  - Similarity function
    - word2vec (pre trained Google News articles)
    - WordNet similarity function using nltk.corpus
- Calculation
  1. Generate a similarity matrix of unique words using the similarity function defined above
  2. Average the similarity score for each word
  3. A list of highest inverse similarity values will be the recommended as anomaly (or highest similarity value for suggestion)

Proposed Approach – Hint: Syntax Cosine Similarity

- Type of problem solved:
    - Anomaly
        - Given vector: ["JPMorgan", "JP Morgan", "J.P. Morgan", "Goldman Sachs"]
          Anomaly should be: ["Goldman Sachs"]
    - Suggestion
        - Given vector: ["J.P. Morgan", "Goldman Sachs", "Citi", "Morgan Stanley"]
          Given word "jp morgan" -> "J.P. Morgan"
    - Similarity function
        - String similarity calculation based on cosine result of two word vectors
- Calculation
    1. Generate a similarity matrix of unique words using the similarity function defined above
    2. Average the similarity score for each word
    3. A list of highest inverse similarity values will be the recommended as anomaly (or highest similarity value for suggestion)

Proposed Approach – Hint: Soundex

- Type of problem solved:
    - Anomaly
        - Given vector: ["Abel", "flail", "fool", "valuate", "Rowe"]
          Anomaly should be: ["Rowe"]
    - Suggestion
        - Given vector: ["gastrointestinal", "Rowe", "who", "Bible"]
          Given word "Abel" -> "Bible"
    - Similarity function
        - Similarity calculation based on the sounding of two words
- Calculation
    1. Generate a similarity matrix of unique words using the similarity function defined above
    2. Average the similarity score for each word
    3. A list of highest inverse similarity values will be the recommended as anomaly (or highest similarity value for suggestion)

Proposed Approach - Hint: Length

- Type of problem solved:
    - Anomaly
        - Given vector: ["firm", "lamb", "gird", "coon", "key", "septuagenarian", "x"]
          Anomaly should be: ["x", "septuagenarian"]
    - Suggestion
        - Given vector: ["prestidigitate", "Ida", "m", "Avignon", "planet"]
          Given word "liquefy" -> "Avignon"
    - Similarity function
        - Similarity calculation based on the length of the entry
- Calculation
    1. Generate the length of each entry
    2. Figure out the zscore using mean and standard deviation, and normalize by the max zscore
    3. A list of highest inverse similarity values will be the recommended as anomaly (or highest similarity value for suggestion)

Proposed Approach – Hint: Frequency

- Type of problem solved:
    - Anomaly
        - Given frequency count: ["duplex": 100, "assault": 80, "impersonal": 50, "hindmost": 2]
          Anomaly should be: ["hindmost"]
    - Suggestion
        - Given vector: ["fieldwork": 100, "lda": 90, "a": 20, "nuthatch": 195]
          Given word "liquefy" -> "nuthatch"
    - Similarity function
        - Similarity calculation based on the frequency of the word
- Calculation
    1. Generate the frequency of each entry
    2. A list of least frequent values will be the recommended as anomaly (or most frequent value for suggestion)

Proposed Approach – Hint: Format

- Type of problem solved:
    - Anomaly
        - Given frequency count: ["0x12343", "0x12345", "0x12346", "0x12347", "012348"]
          Anomaly should be: ["012348"]
    - Suggestion
        - Given vector: ["PROVOST", "Paulsen", "TROMPE", "homology", "923-234-123"]
          Given word "Conservation" -> "Paulsen"
    - Similarity function
        - Similarity calculation is based on how close the format between two words
- Calculation
    1. Generate a similarity matrix of unique words using the similarity function defined above
    2. Average the similarity score for each word
    3. A list of highest inverse similarity values will be the recommended as anomaly (or highest similarity value for suggestion)

Proposed Approach - Model: Linear Regression
A simple one layer linear model is:
Given the six factors [v1, v2, v3, v4, v5, v6] for a word V
LinearResult = w1*v1 + w2*v2 + w3*v3 + w4*v4 + w5*v5 + w6*v6 + b
AnomalyChanceV = sigmoid(LinearResult)
The linear model can only reach:
~ 80% detection for anomaly on training set
~ 30% detection for non-anomaly on training set
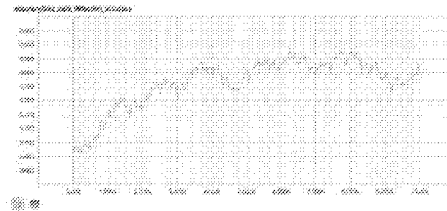
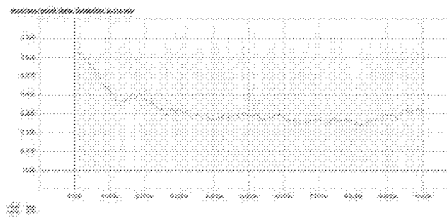

Proposed Approach – Model: CNN

A simple one layered CNN model can be defined as follows:

- Given the six factors [v1, v2, v3, v4, v5, v6] for a word V
- Perform Conv on [v1, v2, v3, v4, v5, v6], generate N feature maps
- Perform a linear operation on N feature maps Two layered CNN model is defined by comparing with the one layer model. The two layered model has another conv performed on the N feature maps. I gains slightly better accuracy but runs slower.

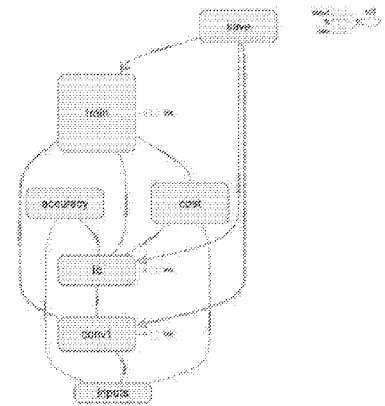

Proposed Approach - Model: CNN (cont.)
The one layer CNN model can reach:
- ~ 97% detection for anomaly on training set, ~ 60% on testing set
- ~ 88% detection for non-anomaly, ~ 83% on testing set
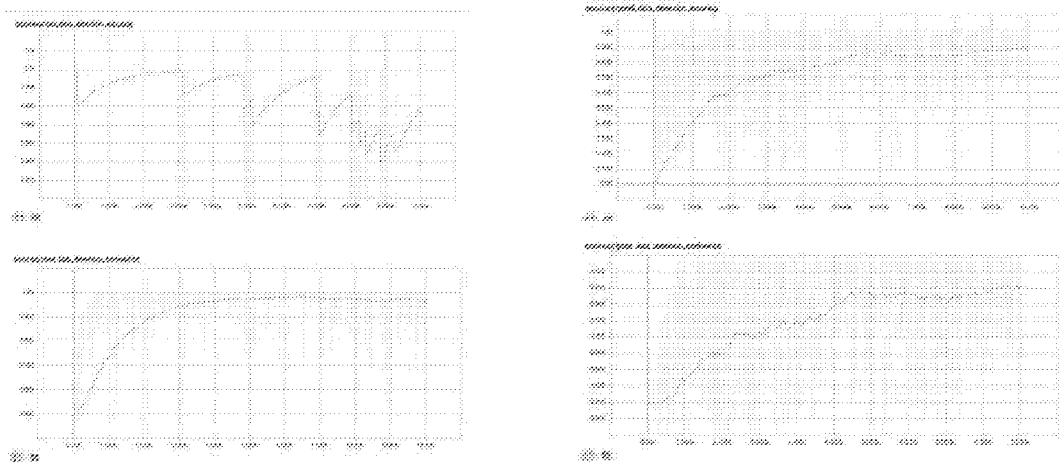

Proposed Approach – Model: CNN (cont.)

Two cost functions are used in this CNN model

- Stop the model from moving towards a everyting-non-anomaly solution since anomalies are a small portion of the whole data
- Use different learning rate to achieve the balance between anomaly and non-anomaly detection.
    - More accurate on anomaly detection
    - Or, more accurate on non-anomaly detection

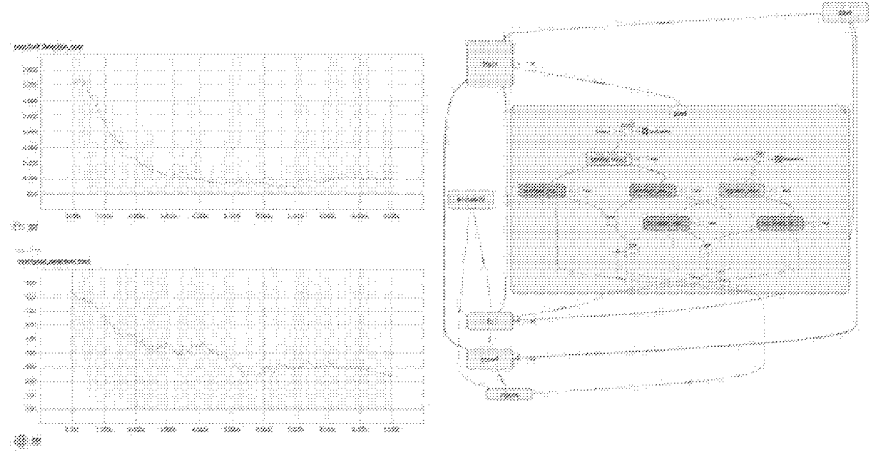

Proposed Approach – Model: CNN (Suggestion)
Very similar to the detection CNN
- Use one cost function instead of two, since suggestion only requires one output (argmax)
The one layer CNN model can reach:
~ 60% accuracy on training set, ~ 70% on testing set
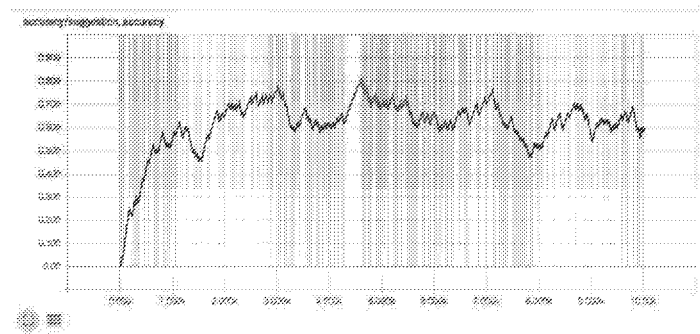

Running the models to clean up data

Automated Detection-Suggestion flow

- Chaining the detection and suggestion model
- Easy to use
- The correctness of anomaly detection will affect the suggestion model.
    - Anomalies that are not detected in the first model will not be suggested
    - False positives generated by the anomaly model will not be considered as a possible suggestion Separated Detection-Feedback-Suggestion flow

- Need a user feedback after each detection model
- Improved accuracy for the entire cleaning process

Visualize the cleanup process

To visualize the cleanup process, we create the following workflow:

- Separated Detection-Feedback-Suggestion flow
    - Array (Input) -> Detection Model -> Histogram
    - Array(Input) -> Suggestion Model -> Histogram
- Automated Detection-Suggestion flow
    - Csv (Input) -> Automated Detection-Suggestion -> Csv (Output)

Since we provide the util functions, more workflows could be extended easily.

Detection-Feedback-Suggestion
Histogram for detection:
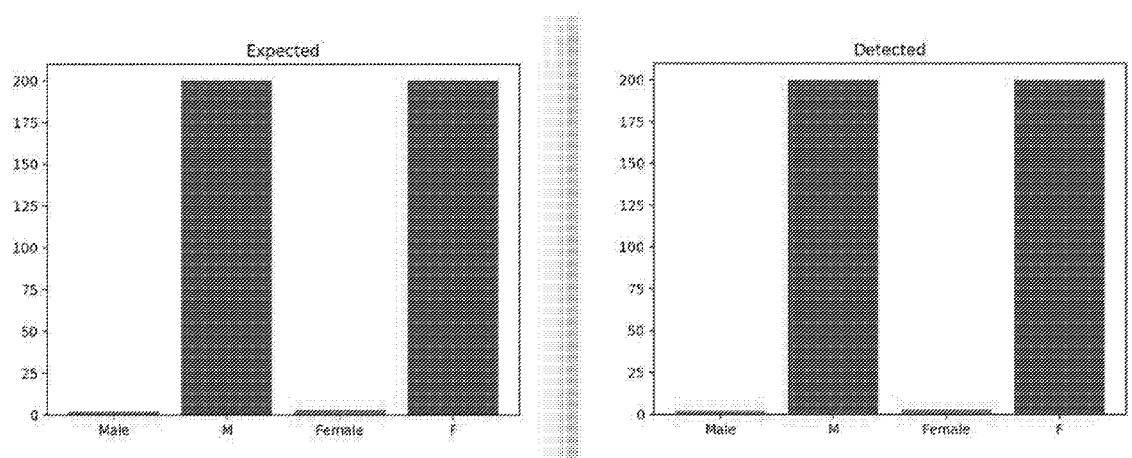

Detection-Feedback-Suggestion
Histogram for suggestion
- Green – expected
- Blue – real
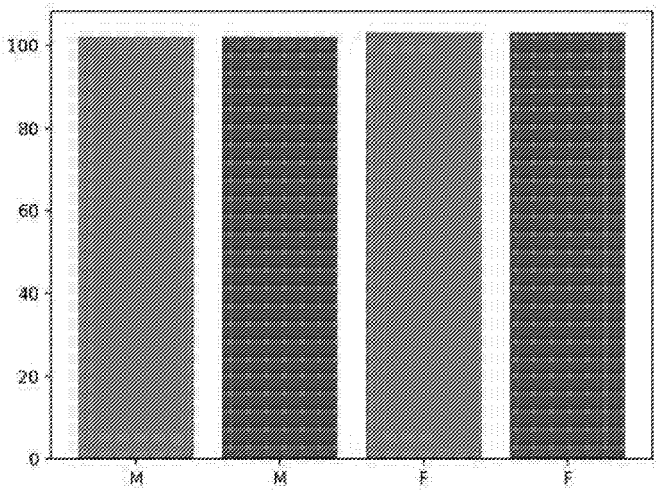

Separated Detection-Feedback-Suggestion

- Example output of running through anomaly detection with Decay-Like distribution, where many "good entries" are low frequency count
    - With limited training data, most of the anomalies are detected
    - Current model trained to sacrifice a bit of false positive rate to boost catch anomaly
    - For suggestion, word2vec plays an important role (which will be talked about later)

| Value | Count | Anomaly | Predicted |
|---|---|---|---|
| IL | 216526 | | |
| Il | 1678 | TRUE | TRUE |
| IN | 1584 | | |
| ILLINOIS | 1017 | TRUE | TRUE |
| ILL | 920 | TRUE | |
| 02602 | 811 | TRUE | TRUE |
| WI | 621 | | |
| CA | 268 | | |
| NY | 180 | | |
| TX | 172 | | TRUE |
| IL. | 144 | TRUE | TRUE |
| VA | 128 | | TRUE |
| MI | 124 | | |
| FL | 121 | | |
| OH | 100 | | TRUE |
| MA | 66 | | |
| NJ | 64 | | |
| MO | 55 | | |
| GA | 51 | | |
| NC | 51 | | |
| PA | 47 | | TRUE |
| OHIO | 45 | TRUE | |
| TEXAS | 43 | TRUE | TRUE |
| MN | 42 | | |
| AZ | 36 | | TRUE |
| NEW YORK | 31 | TRUE | TRUE |
| TN | 29 | | |
| IA | 29 | | TRUE |
| CO | 27 | | TRUE |

Automated Detection-Suggestion

Before:

| | | | | | | | | |
|---|---|---|---|---|---|---|---|---|
| 336 | 36.4 | 5 | 121 | 67 | 2950 | 19.9 | 80 | 2 audi |
| 337 | 30 | 4 | 146 | 67 | 3250 | 21.8 | 80 | 2 mercedes-be |
| 338 | 44.6 | 4 | 91 | 67 | 1850 | 13.8 | 80 | 3 honda |
| 339 | 40.9 | 4 | 85 | 65 | 1835 | 17.3 | 80 | 2 renault |
| 340 | 33.8 | 4 | 97 | 67 | 2145 | 18 | 80 | 3 subaru |
| 341 | 29.8 | 4 | 89 | 62 | 1845 | 15.3 | 80 | 2 volkswagen |
| 342 | 32.7 | 6 | 168 | 132 | 2910 | 11.4 | 80 | 3 datsun |
| 343 | 23.7 | 3 | 70 | 100 | 2420 | 12.5 | 80 | 3 mazda |
| 344 | 35 | 4 | 122 | 88 | 2500 | 15.1 | 80 | 2 triumph |
| 345 | 23.6 | 4 | 140 | 66 | 2905 | 14.3 | 80 | 1 ford |
| 346 | 32.4 | 4 | 107 | 72 | 2290 | 17 | 80 | 3 honda |

After:

| | | | | | | | | |
|---|---|---|---|---|---|---|---|---|
| 335 | 36.4 | 5 | 121 | 67 | 2950 | 19.9 | 80 | 2 audi |
| 336 | 30 | 4 | 146 | 67 | 3250 | 21.8 | 80 | 2 mercedes |
| 337 | 44.6 | 4 | 91 | 67 | 1850 | 13.8 | 80 | 3 honda |
| 338 | 40.9 | 4 | 85 | 65 | 1835 | 17.3 | 80 | 2 renault |
| 339 | 33.8 | 4 | 97 | 67 | 2145 | 18 | 80 | 3 subaru |
| 340 | 29.8 | 4 | 89 | 62 | 1845 | 15.3 | 80 | 2 volkswagen |
| 341 | 32.7 | 6 | 168 | 132 | 2910 | 11.4 | 80 | 3 datsun |
| 342 | 23.7 | 3 | 70 | 100 | 2420 | 12.5 | 80 | 3 mazda |
| 343 | 35 | 4 | 122 | 88 | 2500 | 15.1 | 80 | 2 triumph |
| 344 | 23.6 | 4 | 140 | 66 | 2905 | 14.3 | 80 | 1 ford |
| 345 | 32.4 | 4 | 107 | 72 | 2290 | 17 | 80 | 3 honda |

Going Forward

- word2vec
    - our current model of word2vec compiled using GoogleNews are not yielding good results in some cases. In order to improve suggestion and anomaly detection accuracy to extract semantic:
        - Compile with a much bigger pool of words like wikipedia
        - Improve training using dynamic word2vec to improve accuracy overtime
- Balancing
    - Since our input data are constructed via the hints outlined before, it's placing a bias in the ANN in term of likelihood of each scenario from happening. This can be easily solved with real world data
- Hints
    - Findings are based on hints approach which is still in infancy stage
        - Additional hints
        - Represent the problem differently

APPENDIX B

Tensorflow and Neural Networks Application in Data Cleaning
Project Report
Chang Lu & George Zhang

Abstract

More and more companies are using big data to help drive their business decision. Data comes in all shape and sizes. Before data is consumed, it needs to be cleaned to make sure any conclusion based on the data is reliable. Data Scientist typically spend more than 70% of the time cleaning the data before doing any data analysis. By using a neural network, it will reduce the repetitive work and speed up the data cleaning process.

Gathering data is not easy for the data cleaning project. The dirty data needs be collected from lots of data sources. And to perform the supervise training, the dirty data needs to be cleaned manually to provide the label. This is very time consuming and not doable within the limited project time. As a compromised solution, the test data is created based on the real data from https://www.opendatanetwork.com/, while the training data is the mock data provided by a generator. The model should behave better if trained by real data.

Another major challenge we are facing is given a column of data, how to transfer the data to the vectors that a neural network can understand and work on. Both syntactic and semantic factor should be considered. For this project, six factors are extracted out from the the list of words. The six factors are semantic similarity (word2vec or similar approach from nltk package), syntax cosine similarity, soundex similarity, length similarity, frequency similarity, format similarity.

The data cleaning process was divided into two process, anomaly detection and anomaly suggestion. Two neural networks was trained respectively. Anomaly detection CNN can reach 97% detection for anomaly and 88% detection for non-anomaly on training set, and 60%, 83% detections respectively on testing set. Suggestion detection CNN can reach 60% accuracy on training set and 70% on testing set.

With the two neural networks, there are mainly two options for using them in cleaning data. First, it is the automatic detection-suggestion flow. In order to demonstrate how it works, a simple script was developed. It reads a csv file, perform the detection and suggestion automatically, then write the suggested version to a new csv file. The other option is to get user feedback after the detection, so the wrong detection won't affect the suggestion model. To demonstrate it, a python script is developed to use histogram to visualize the result. So it is user to understand the result and provide feedbacks. The second approach requires more interactions, but generally gains higher accuracy.

Project Setup

Make sure the following libraries are installed:
- Tensorflow
- Gensim
- Numpy
- Matplotlib
- Nltk Download the pre-trained word2vec bin file GoogleNews-vectors-negative300.bin in the same project folder

Training the model

There are four models that can be trained:
- detectionLinear.py
- detectionConv.py
- detectionConv1.py
- suggestionConv.py For each model, the following operators can be modified:
- Learning rate and training epoch:

learningRate = 0.00001
trainingEpochs = 10000
- The learning rate relationship of two costs function (does not apply to suggestionConv)

with tf.name_scope("train"):
  *# use two separate optimizers for good data and anomaly part*
  optimizer1 = tf.train.AdamOptimizer(learningRate).minimize(cost1)
  optimizer2 = tf.train.AdamOptimizer(0.7 * learningRate).minimize(cost2)
- Use word2vec or not. If false, nltk's similarity functions will be used instead.

useWord2Vec = True

Running the model will produce the following output:
- Scalars on tensorboard under ./log
  - Please delete the old log folder before re-run

- Graph on tensorboard
- Output on command line to show the training process
- A testing results based on the training data
- A saved model (not apply to detectionLinear)

To run the training, simple run it in pyCharm, or in terminal, type "python targetFile.py".
To load the tensorboard, in the project root directory do: tensorboard --logdir='./log' detectionConv.py

Here is the scalars for detectionConv:

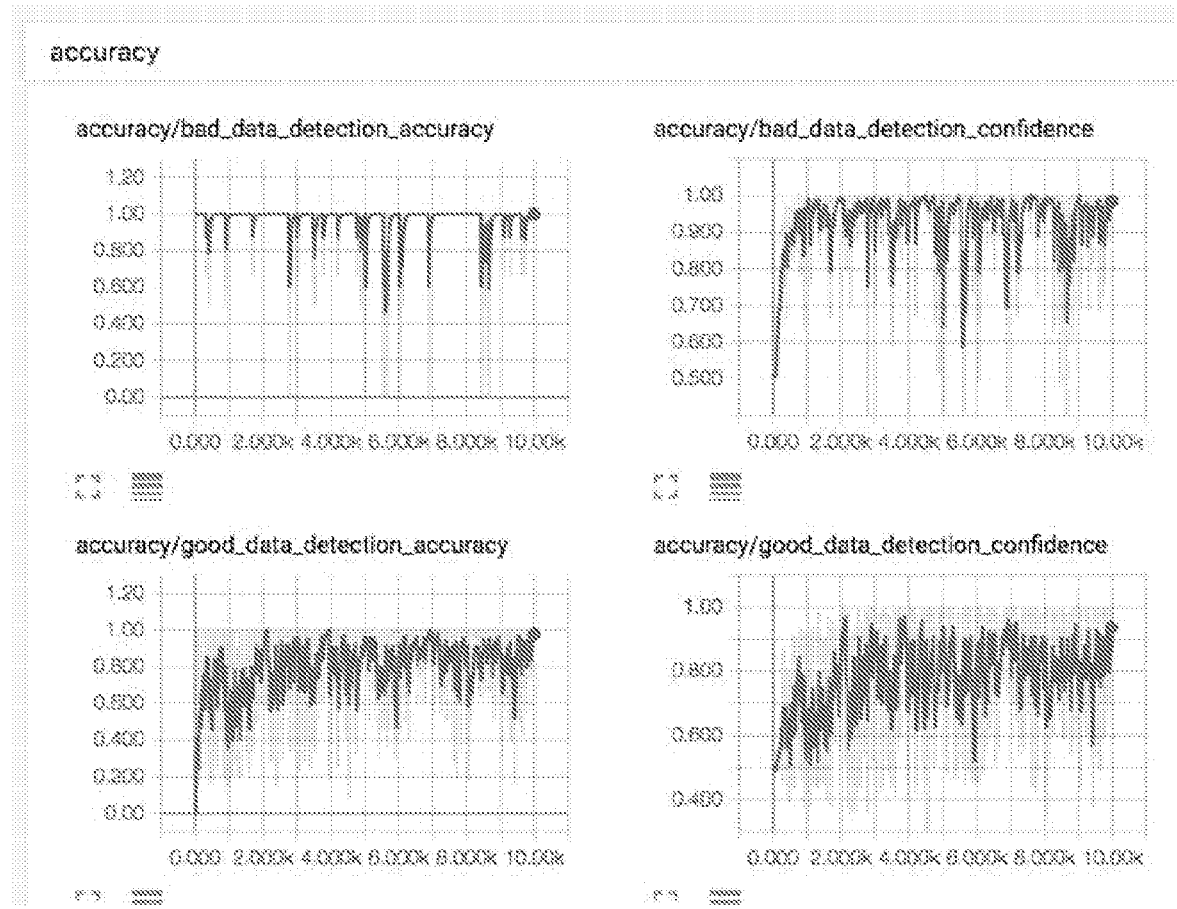

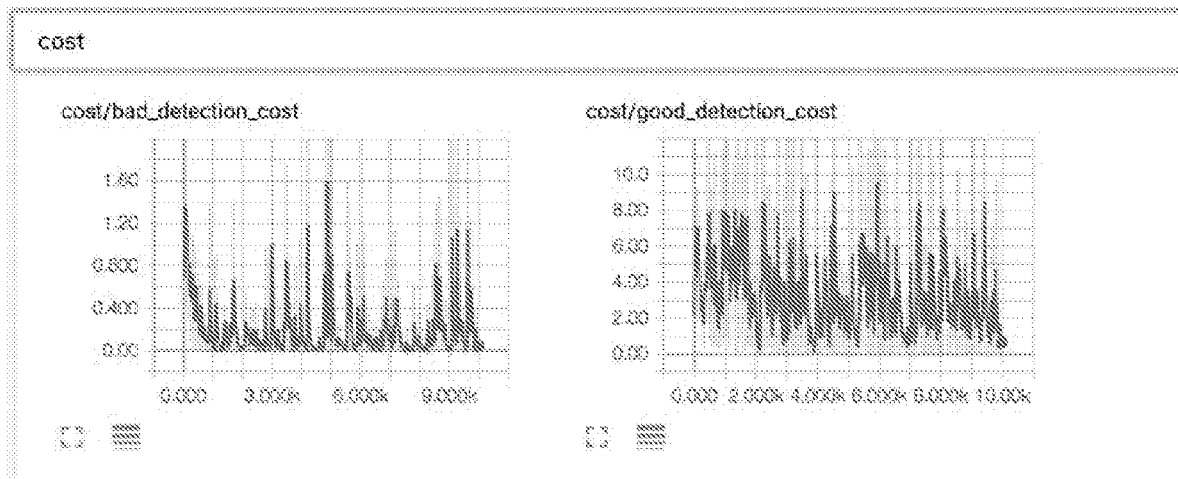
And the graph for detectionConv:

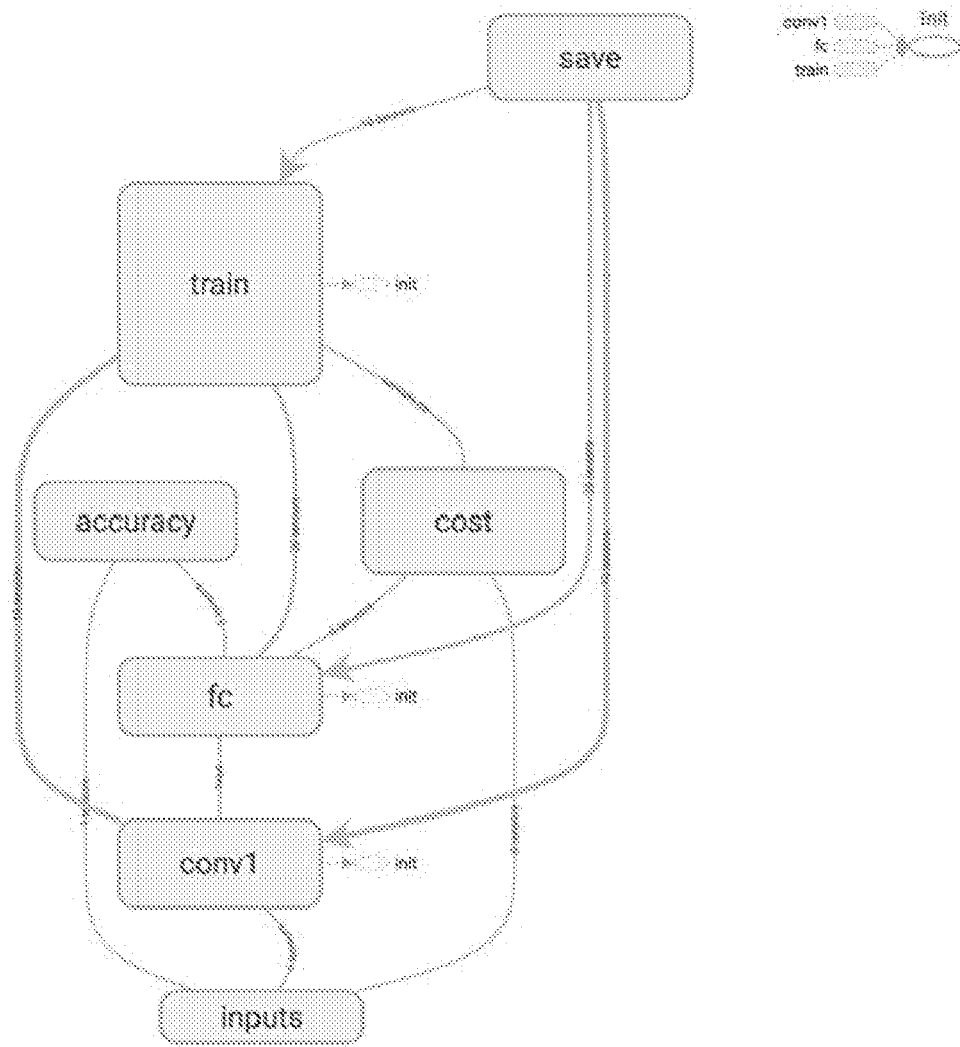
Detection Conv contains a conv layer and a fc layer, with two cost functions. Click to expand the different part of the graph to view the details:
The conv layer:

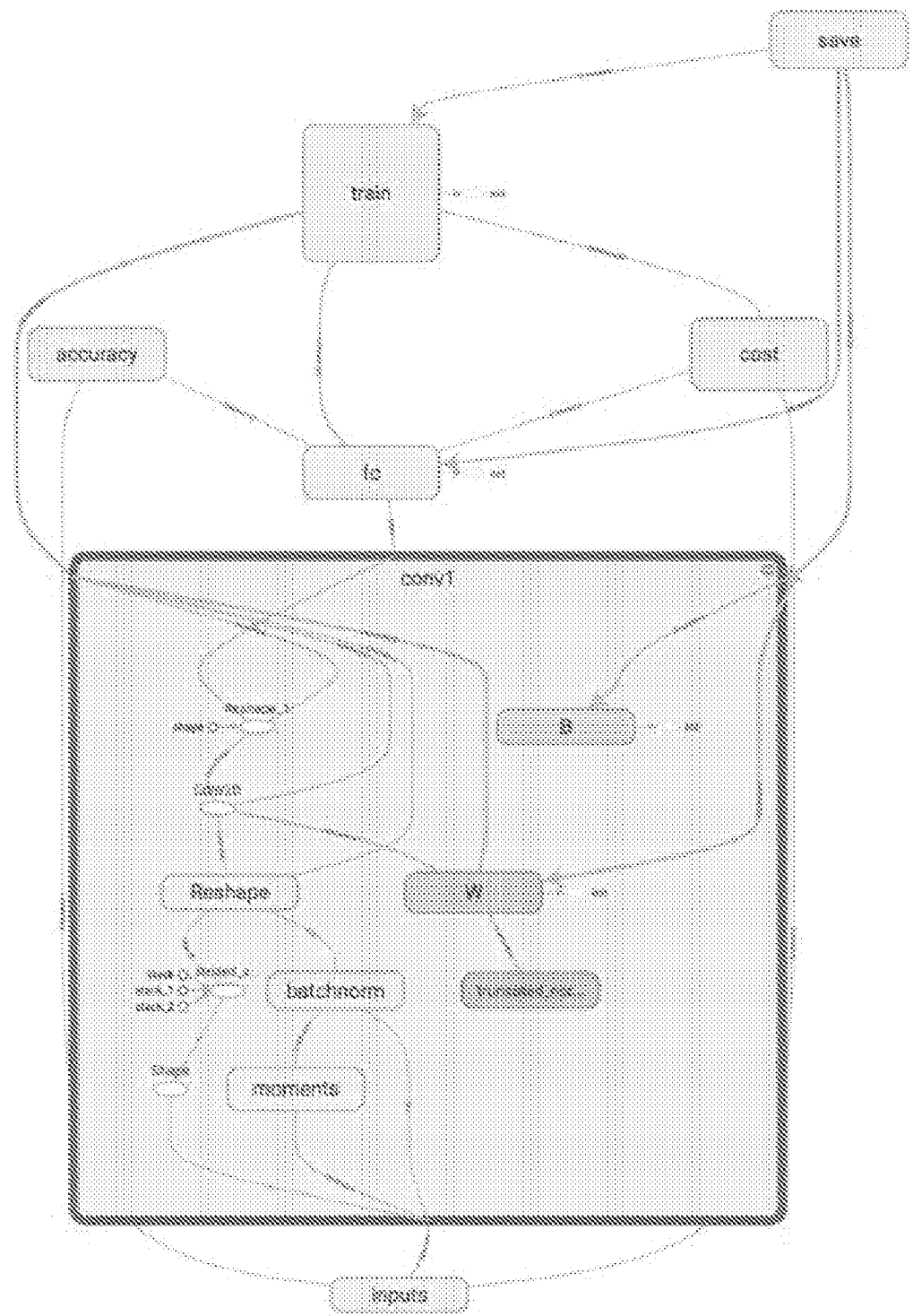
The fc layer:

tf.summary.scalar("good detection cost", cost2)

*# seperate the cost function allows us later use different learning rate for the two cost optimizer*
*# or a simple cost can be defined:*
*# cost = tf.reduce_sum(tf.nn.sigmoid_cross_entropy_with_logits(logits=pred, labels=Y))*
*# tf.summary.scalar("cost", cost)* detectionConv2.py

This is the 2 layer conv network.

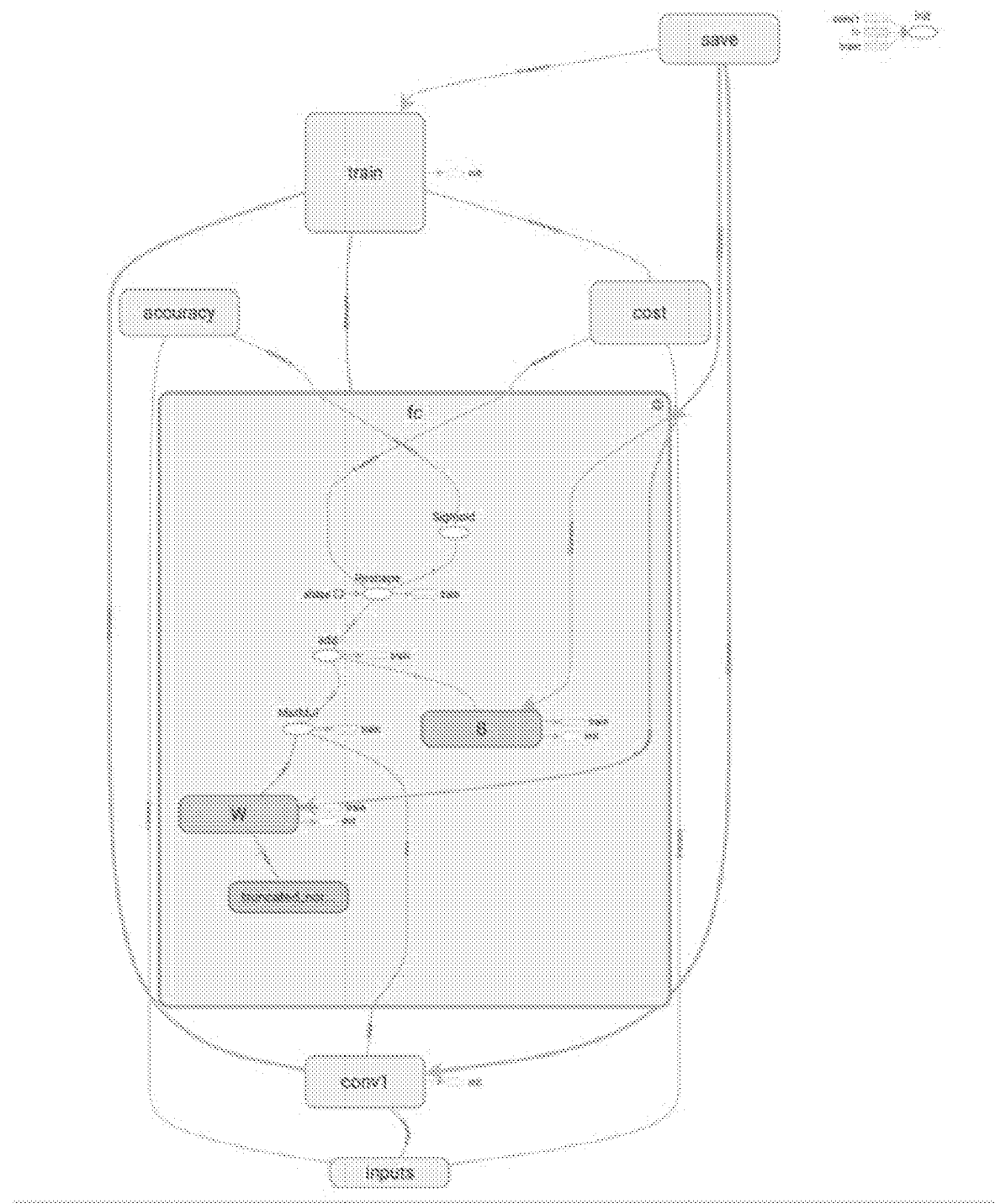
And the cost functions:

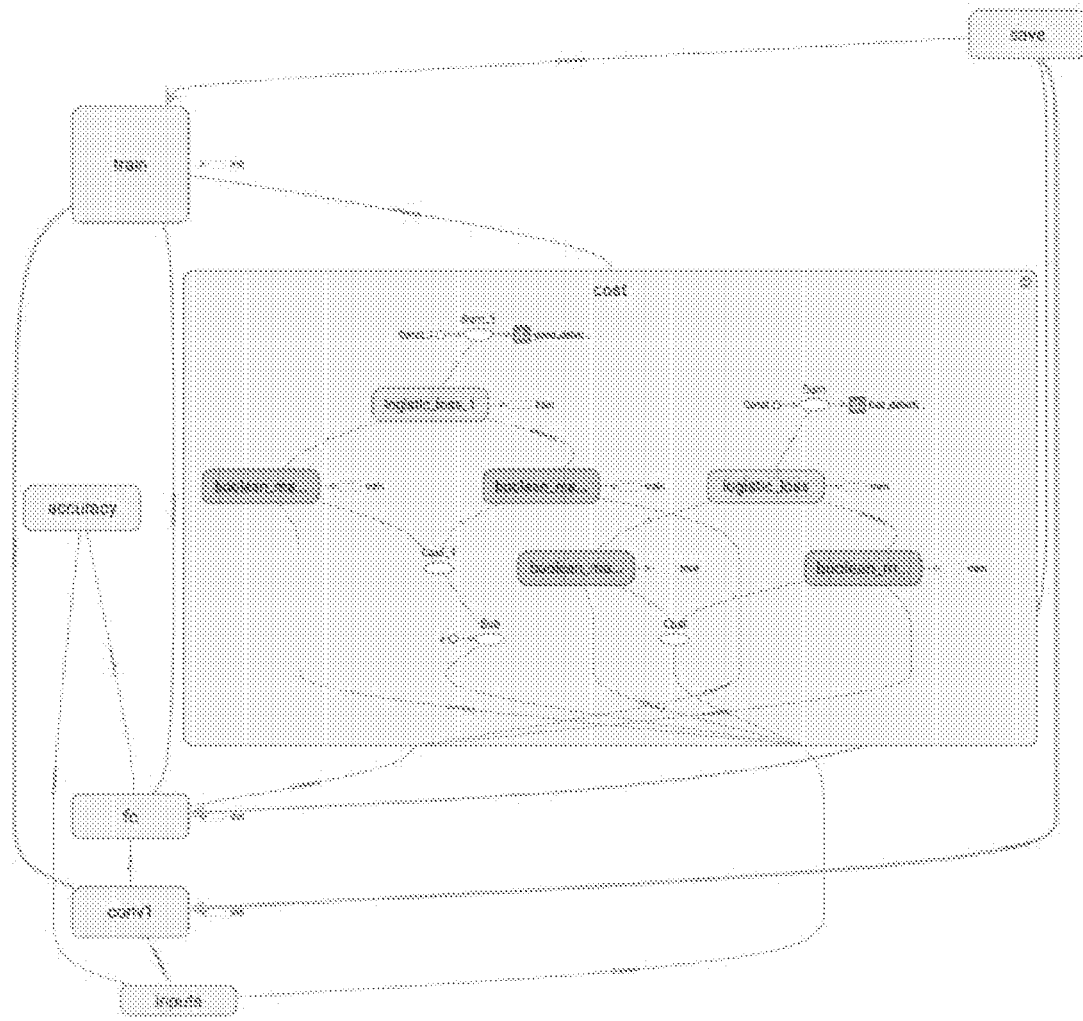
Here is the core codes for the detectionConv:
*conv layer*
with tf.name_scope("conv1"):
  # *W: perform a conv on all six factors for a single word*
  w = tf.Variable(tf.truncated_normal([1, 6, 1, featureMapSize1], stddev=0.01), name="W")
  b = tf.Variable(tf.constant(0.01, shape=[featureMapSize1]), name="B")
  nSample = tf.shape(Y)[0]
  # *normalize the input*
  mean, variance = tf.nn.moments(X, [0,1])

```
Xnorm = tf.nn.batch_normalization(X, mean, variance, 0, 1, 1e-12)

xReshape = tf.reshape(Xnorm, [-1, nSample, 6, 1])
# perform a wide convolution for each row and generate a result in each of the 64 feature maps
conv = tf.nn.conv2d(xReshape, w, strides=[1, 1, 1, 1], padding="VALID")

h = tf.nn.relu(tf.nn.bias_add(conv, b), name="relu")

flattened0 = tf.reshape(conv, [-1, 1 * featureMapSize1])

# fc layer
with tf.name_scope("fc"):
    w1 = tf.Variable(tf.truncated_normal([1 * featureMapSize1, 1], stddev=0.01), name="W")
    b1 = tf.Variable(tf.constant(0.01, shape=[1]), name="B")

pred = tf.reshape(tf.matmul(flattened0, w1) + b1, [-1])
    sig_pred = tf.sigmoid(pred)

with tf.name_scope("cost"):
    # using boolean mask to put the prediction into two parts, the good data part and the anomaly part
    YMask = tf.cast(Y, tf.bool)
    badDetectionPred = tf.boolean_mask(pred, YMask)
    badDetectionLabel = tf.boolean_mask(Y, YMask)
    YInvMask = tf.cast(tf.subtract(1.0, Y), tf.bool)
    goodDetectionPred = tf.boolean_mask(pred, YInvMask)
    goodDetectionLabel = tf.boolean_mask(Y, YInvMask)

# calculate the cost separately
    cost1 = tf.reduce_sum(tf.nn.sigmoid_cross_entropy_with_logits(logits=badDetectionPred, labels=badDetectionLabel))
    cost2 = tf.reduce_sum(tf.nn.sigmoid_cross_entropy_with_logits(logits=goodDetectionPred, labels=goodDetectionLabel))

# write to tensorboard
    tf.summary.scalar("bad detection cost", cost1)
```

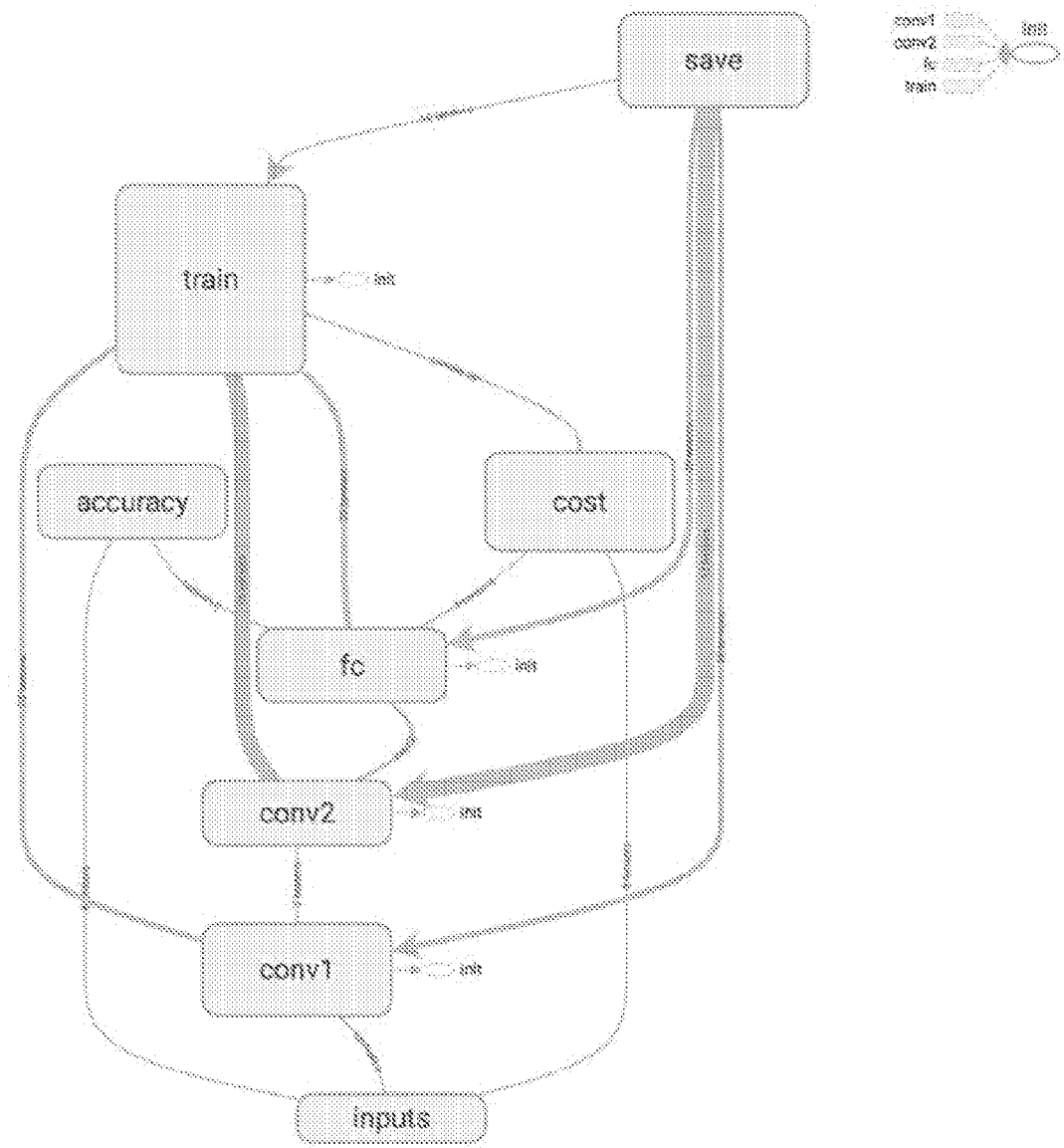
It performs slightly better than the one layer version. To compare, see the graph in tensorboard (yellow - 2 layer conv, green = 1 layer conv):

accuracy
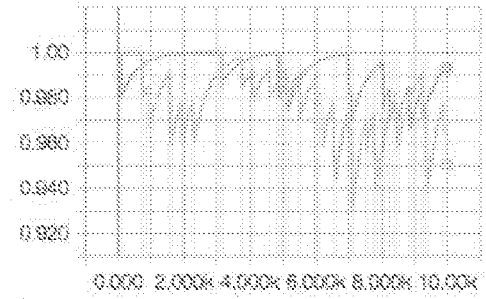
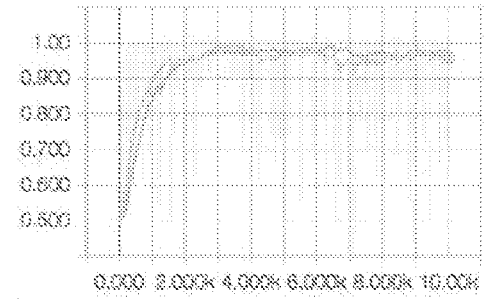
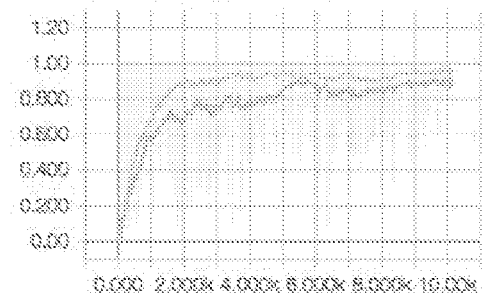
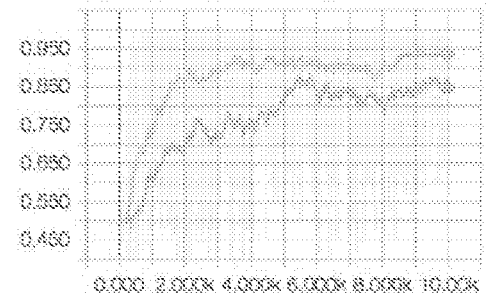
cost
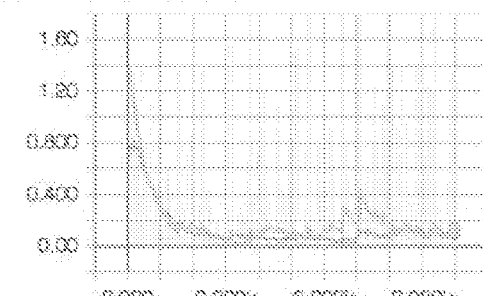
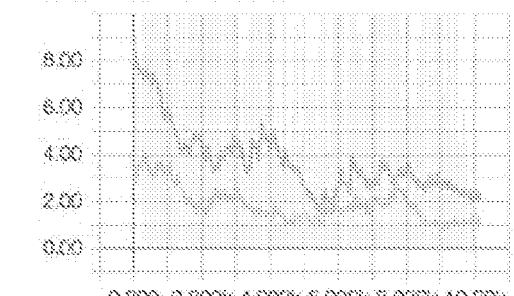
The core codes for detectionConv2 is:
with tf.name_scope("conv1"):
*W: perform a conv on all six factors for a single word*

```
w = tf.Variable(tf.truncated_normal([1, 6, 1, featureMapSize1], stddev=0.01),
name="W")
    b = tf.Variable(tf.constant(0.01, shape=[featureMapSize1]), name="B")

nSample = tf.shape(Y)[0]

# normalize the input
    mean, variance = tf.nn.moments(X, [0,1])
    Xnorm = tf.nn.batch_normalization(X, mean, variance, 0, 1, 1e-12)

xReshape = tf.reshape(Xnorm, [-1, nSample, 6, 1])
    # perform a wide convolution for each row and generate a result in each of the 64 feature maps
    conv = tf.nn.conv2d(xReshape, w, strides=[1, 1, 1, 1], padding="VALID")
    h = tf.nn.relu(tf.nn.bias_add(conv, b), name="relu")

# Construct the second conv layer
with tf.name_scope("conv2"):
    # flatten all the feature maps to a single row
    flattened0 = tf.reshape(h, [-1, 1 * featureMapSize1])

# apply a wide convolution on each row
    xReshape2 = tf.reshape(flattened0, [-1, nSample, k, 1])
    w3 = tf.Variable(tf.truncated_normal([1, k, 1, featureMapSize2], stddev=0.01),
name="W")
    b3 = tf.Variable(tf.constant(0.01, shape=[featureMapSize2]), name="B")

conv3 = tf.nn.conv2d(xReshape2, w3, strides=[1, 1, 1, 1], padding="VALID")
    flattened = tf.reshape(conv3, [-1, 1 * featureMapSize2])

# fc layer
with tf.name_scope("fc"):
    w1 = tf.Variable(tf.truncated_normal([1 * featureMapSize2, 1], stddev=0.01),
name="W")
    b1 = tf.Variable(tf.constant(0.01, shape=[1]), name="B")

pred = tf.reshape(tf.matmul(flattened, w1) + b1, [-1])
    sig_pred = tf.sigmoid(pred)
``` detectionLinear.py
This is the linear model graph:
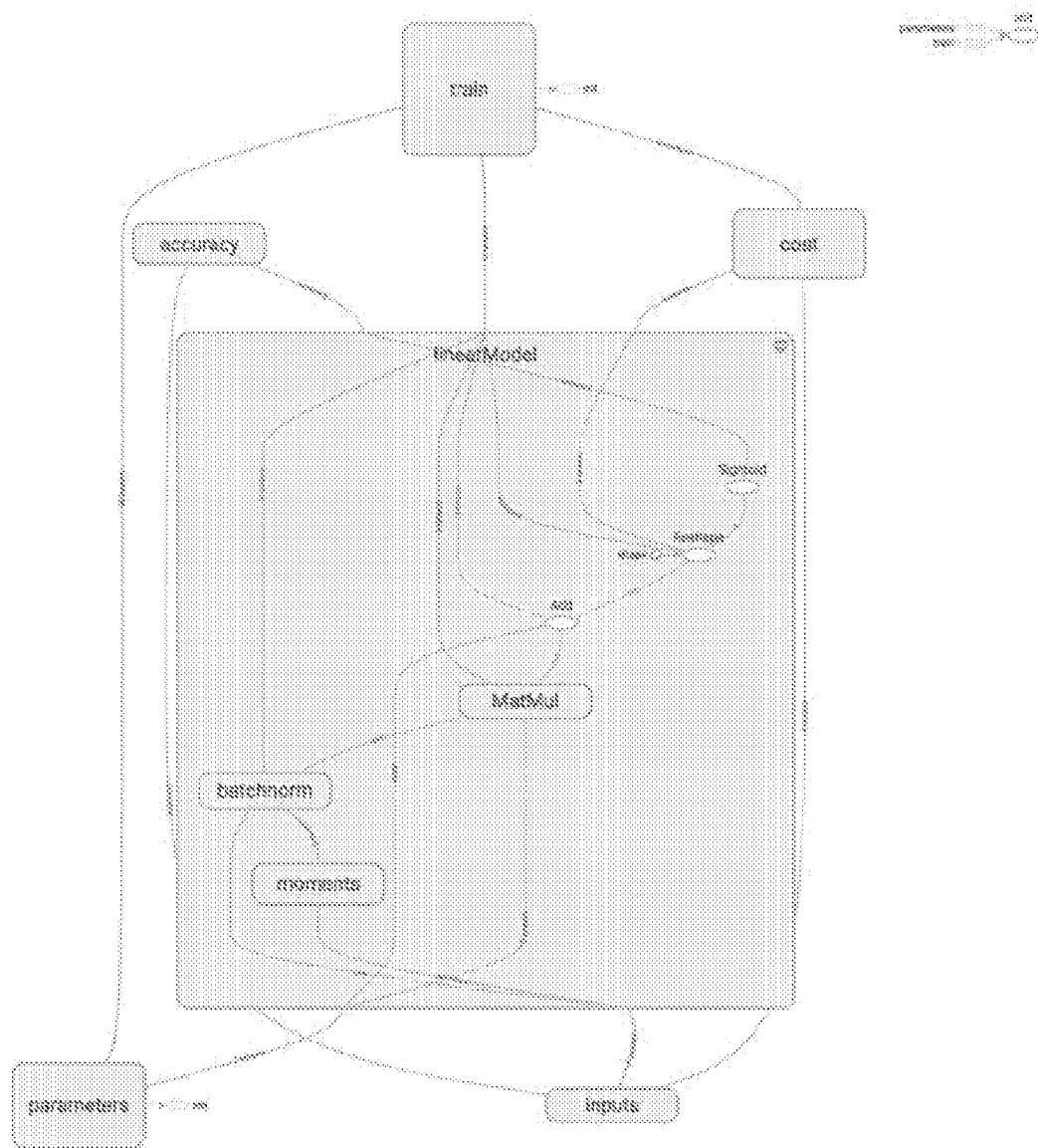
Linear model does not perform well on the detection, here is the comparison visualized in tensorboard (purple - linear model, green - one layer conv model):

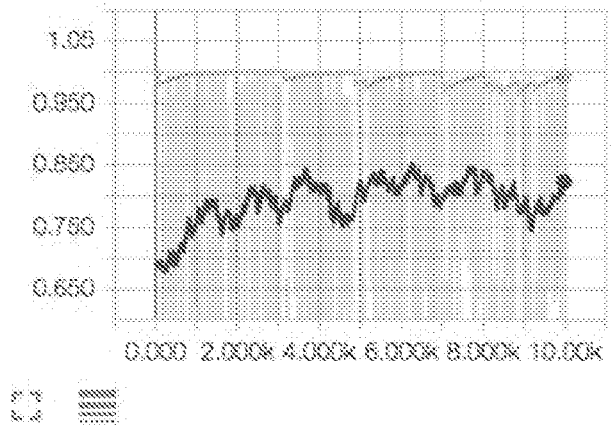
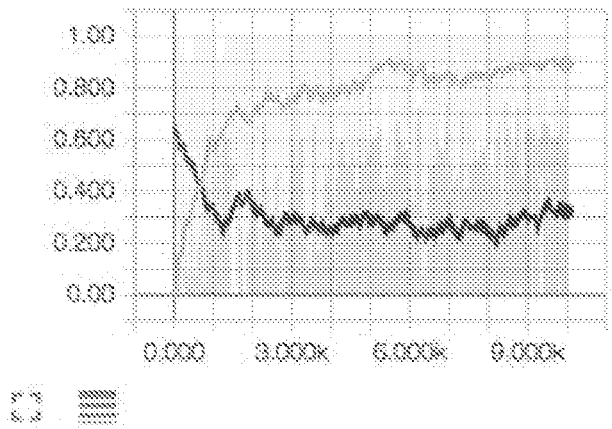
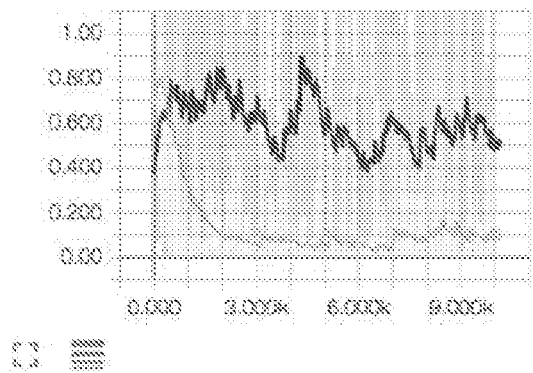
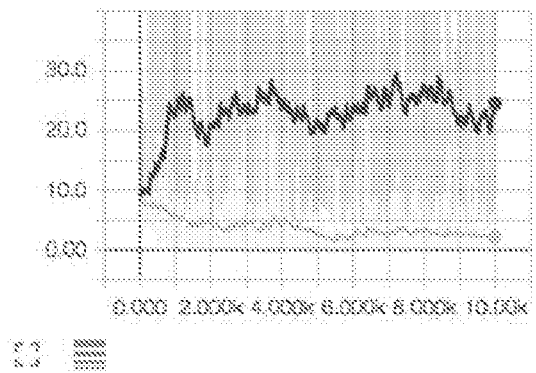
The core codes for linear model:
*Construct a linear model*
with tf.name_scope("linearModel"):
  # *normalize the input* mean, variance = tf.nn.moments(X, [0, 1])
Xnorm = tf.nn.batch_normalization(X, mean, variance, 0, 1, 1e-12)
*# linear layer 1*
pred = tf.reshape(tf.add(tf.matmul(W, Xnorm), b), [-1])
sig_pred = tf.sigmoid(pred)
suggestionConv.py
Here is the graph for the suggestion model:
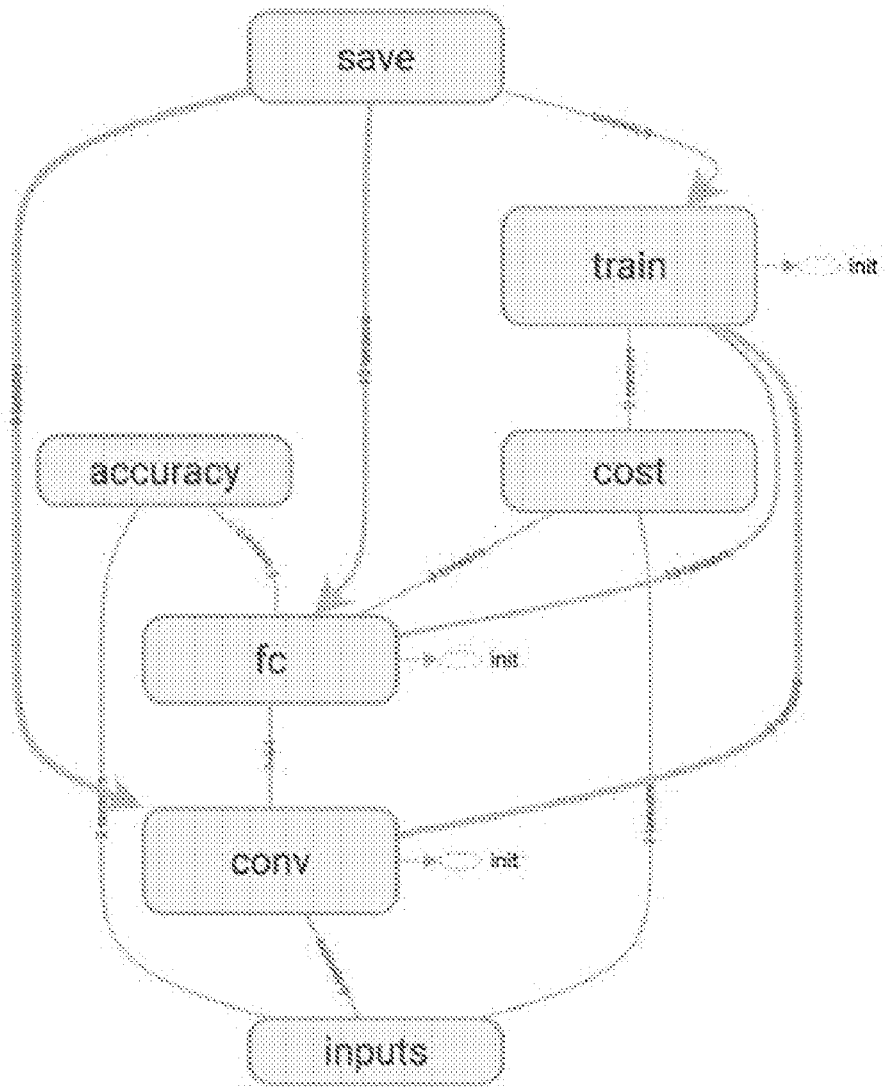
More details on conv and cost:

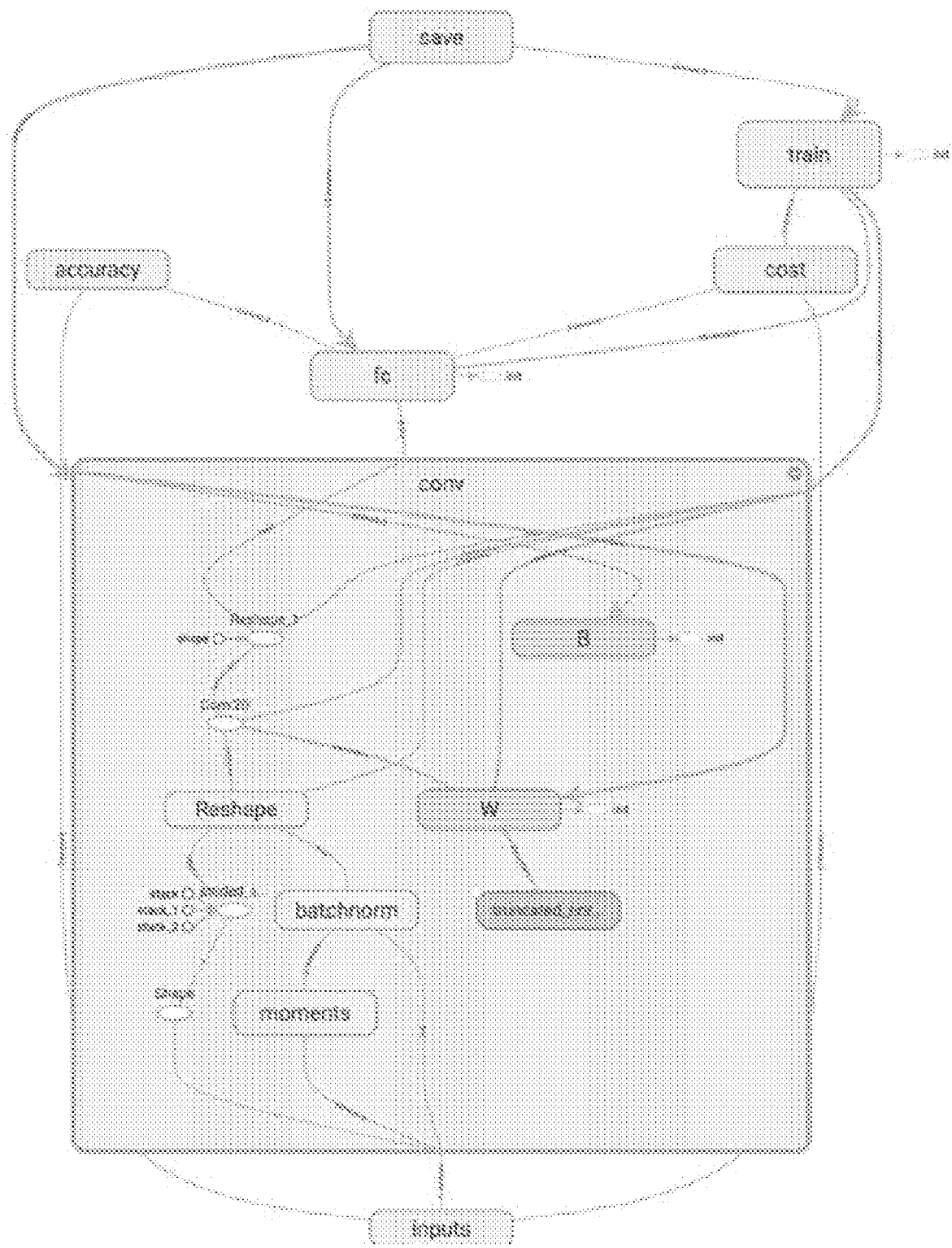

111 112
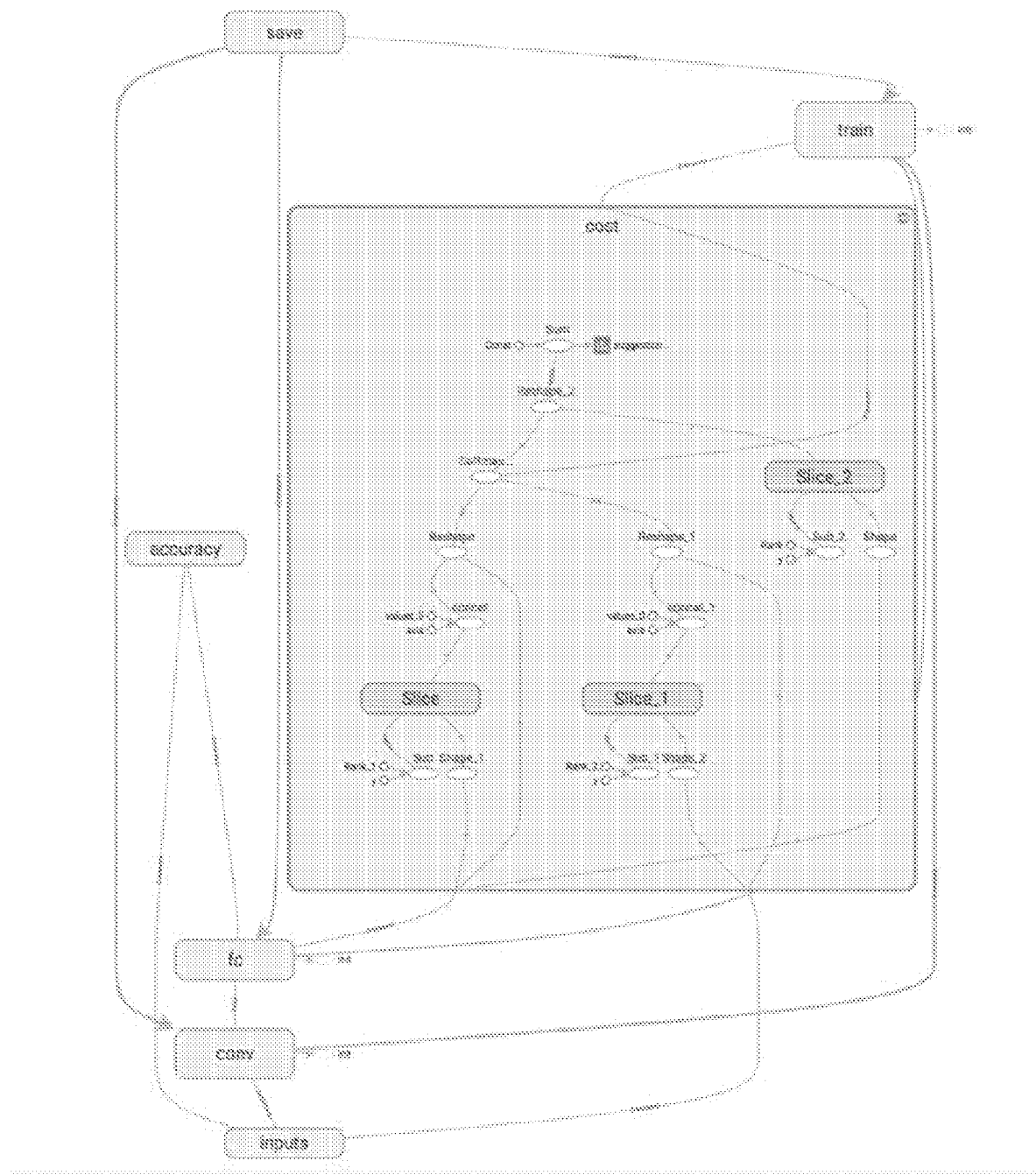
Here is the scalars report:

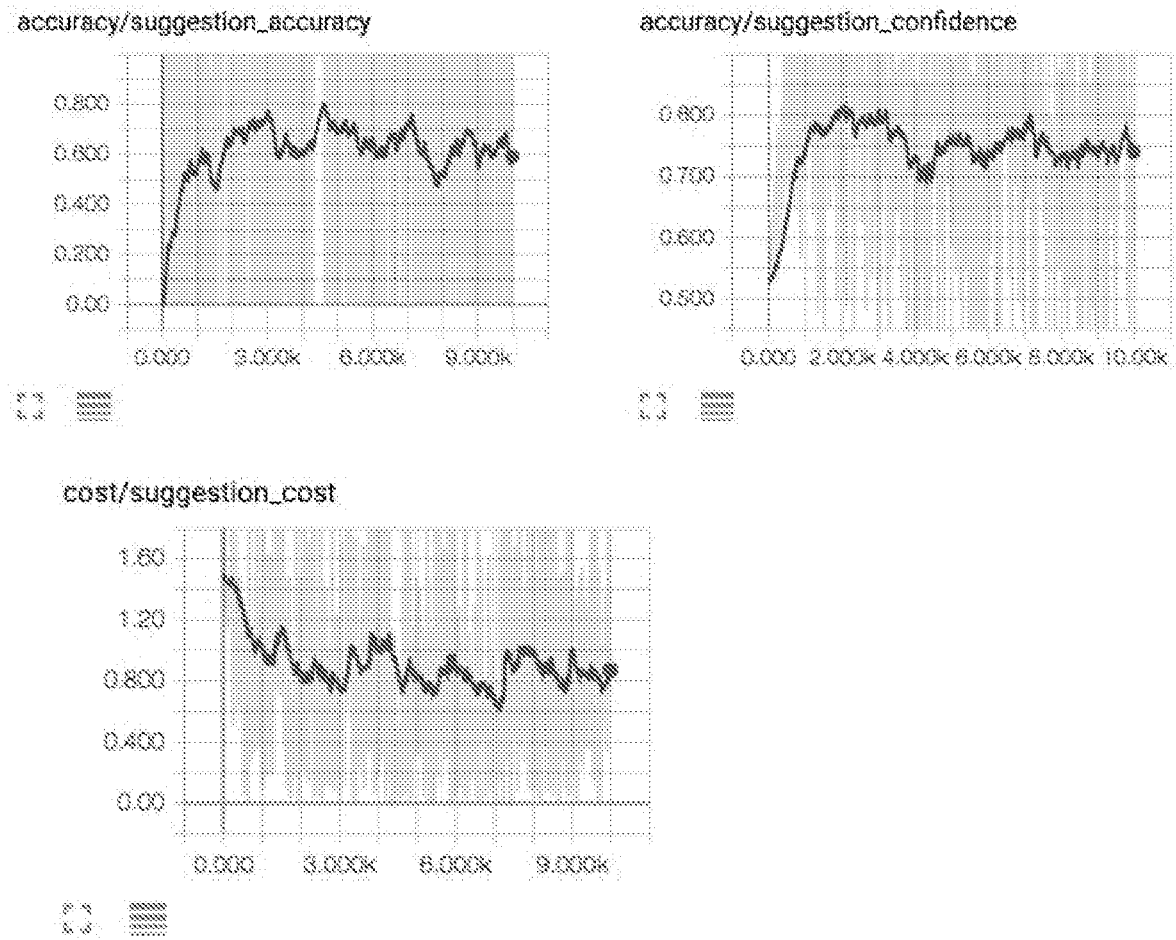

Run the model on test set

To run the test, make sure the models are already trained.

Detection model can be run on test set using detectionModelTest.py
- On line 36, change the model file name
saver = tf.train.import_meta_graph('detectionConv/conv-1layer-useWord2Vec-True-20000.meta', clear_devices=True)
  - On line 8, change to use word2vec or not. If false, ntlk will be used instead.
    useWord2Vec = True detectionModelTest will load the testing set and perform the detection model on each one, print out the test log and gives a summary:

('Test ', 0)
Testing...
('Testing accuracy=', 0.67045158, ',', 0.99928284, ',', 0.5, ',', 1.0)

.
.
.

('Test ', 15)
Testing...
('Testing accuracy=', 0.99992943, ',', 0.80662704, ',', 1.0, ',', 1.0)
('Test ', 16)
Testing...
('Testing accuracy=', 0.99771833, ',', 0.85536987, ',', 1.0, ',', 0.85714287)
('Overall accuracy: ', 0.5901960778762313, 0.83404889878104715)

Suggestion model can be run on test set using suggestionModelTest.py
- On line 34, change the model file name
  saver = tf.train.import_meta_graph('suggestionConv/conv-suggest-10000.meta', clear_devices=True)
- On line 8, change to use word2vec or not. If false, ntlk will be used instead.
  useWord2Vec = True suggestionModelTest will load the testing set and perform the detection model on each one, print out the test log and gives a summary:

('Test ', 0)
Testing...
('Testing accuracy=', 1.0)
Testing...
('Testing accuracy=', 1.0)
('Test ', 1)
.
.
.
('Test ', 9)
Testing...
('Testing accuracy=', 0.0)
Testing...
('Testing accuracy=', 1.0)
Testing...
('Testing accuracy=', 0.0)
('Overall accuracy: ', 0.72340425531914898)

The two models can be run together on test set, use the file workflowTest.py to run it.

- On line 59, change the model file name
  saver = tf.train.import_meta_graph('detectionConv/conv-1layer-useWord2Vec-True-20000.meta', clear_devices=True)
- On line 77, change the model file name
  saver = tf.train.import_meta_graph('detectionConv/conv-1layer-useWord2Vec-True-20000.meta', clear_devices=True)
- On line 8, change to use word2vec or not. If false, ntlk will be used instead.
  useWord2Vec = True workflowTest will load the two models and perform them on each test set, it prints out the test log and gives a summary:

('Test', 0)
['M', 'F']
['M', 'F']
0.00 good data get detected wrong.
0.00 bad data does not get detected.
1.00 accurate suggestion
0.00 wrong suggestion
.
.
.
('Test', 5)
['Prince Georges', 'Carroll', 'Baltimore', 'Anne Arundel', 'Montgomery', 'Frederick']
['Prince Georges', 'Carroll', 'Baltimore', 'Anne Arundel', 'Montgomery', 'Frederick']
0.00 good data get detected wrong.
0.00 bad data does not get detected.
0.33 accurate suggestion
0.67 wrong suggestion
In total
0.39 good data get detected wrong.
0.32 bad data does not get detected.
0.57 accurate suggestion
0.43 wrong suggestion Visualize the process Automated Detection-Suggestion Model Run it through csvCleanTest.py
- On line 59, change the model file name
saver = tf.train.import_meta_graph('detectionConv/conv-1layer-useWord2Vec-True-20000.meta', clear_devices=True)
- On line 76, change the model file name
saver = tf.train.import_meta_graph('detectionConv/conv-1layer-useWord2Vec-True-20000.meta', clear_devices=True)
- On line 55, change the input file name
fileData = csvUtil.csvUtil.readCsv('auto_mpg_original.csv', True)
- On line 101, change the output file name
csvUtil.csvUtil.writeCsv("auto_mpg_cleaned.csv", fileData)
- On line 9, change to use word2vec or not. If false, ntlk will be used instead.
useWord2Vec = True A new csv file will be generated in the project root folder.

Before cleaning:

| 335 | 36.4 | 5 | 121 | 67 | 2950 | 19.9 | 80 | 2 audi |
|---|---|---|---|---|---|---|---|---|
| 336 | 30 | 4 | 146 | 67 | 3250 | 21.8 | 80 | 2 mercedes-ben |
| 337 | 44.6 | 4 | 91 | 67 | 1850 | 13.8 | 80 | 3 honda |
| 338 | 40.9 | 4 | 85 | 66 | 1835 | 17.3 | 80 | 2 renault |
| 339 | 33.8 | 4 | 97 | 67 | 2145 | 18 | 80 | 3 subaru |
| 340 | 29.8 | 4 | 89 | 62 | 1845 | 15.3 | 80 | 2 volkswagen |
| 341 | 32.7 | 6 | 168 | 132 | 2910 | 11.4 | 80 | 3 datsun |
| 342 | 23.7 | 3 | 70 | 100 | 2420 | 12.5 | 80 | 3 mazda |
| 343 | 35 | 4 | 122 | 88 | 2500 | 15.1 | 80 | 2 triumph |
| 344 | 23.6 | 4 | 140 | 66 | 2905 | 14.3 | 80 | 1 ford |
| 345 | 32.4 | 4 | 107 | 72 | 2290 | 17 | 80 | 3 honda |

After cleaning:

| 335 | 36.4 | 5 | 121 | 67 | 2950 | 19.9 | 80 | 2 audi |
|---|---|---|---|---|---|---|---|---|
| 336 | 30 | 4 | 146 | 67 | 3250 | 21.8 | 80 | 2 mercedes |
| 337 | 44.6 | 4 | 91 | 67 | 1850 | 13.8 | 80 | 3 honda |
| 338 | 40.9 | 4 | 85 | 66 | 1835 | 17.3 | 80 | 2 renault |
| 339 | 33.8 | 4 | 97 | 67 | 2145 | 18 | 80 | 3 subaru |
| 340 | 29.8 | 4 | 89 | 62 | 1845 | 15.3 | 80 | 2 volkswagen |
| 341 | 32.7 | 6 | 168 | 132 | 2910 | 11.4 | 80 | 3 datsun |
| 342 | 23.7 | 3 | 70 | 100 | 2420 | 12.5 | 80 | 3 mazda |
| 343 | 35 | 4 | 122 | 88 | 2500 | 15.1 | 80 | 2 triumph |
| 344 | 23.6 | 4 | 140 | 66 | 2905 | 14.3 | 80 | 1 ford |
| 345 | 32.4 | 4 | 107 | 72 | 2290 | 17 | 80 | 3 honda |

Histogram for detection model

Run it through histoDetection.py
- On line 41, change the model file name saver = tf.train.import_meta_graph('detectionConv/conv-1layer-useWord2Vec-True-20000.meta', clear_devices=True)
- On line 9, change to use word2vec or not. If false, ntlk will be used instead.
  useWord2Vec = True A histogram will be produced for both the expected and the detection:

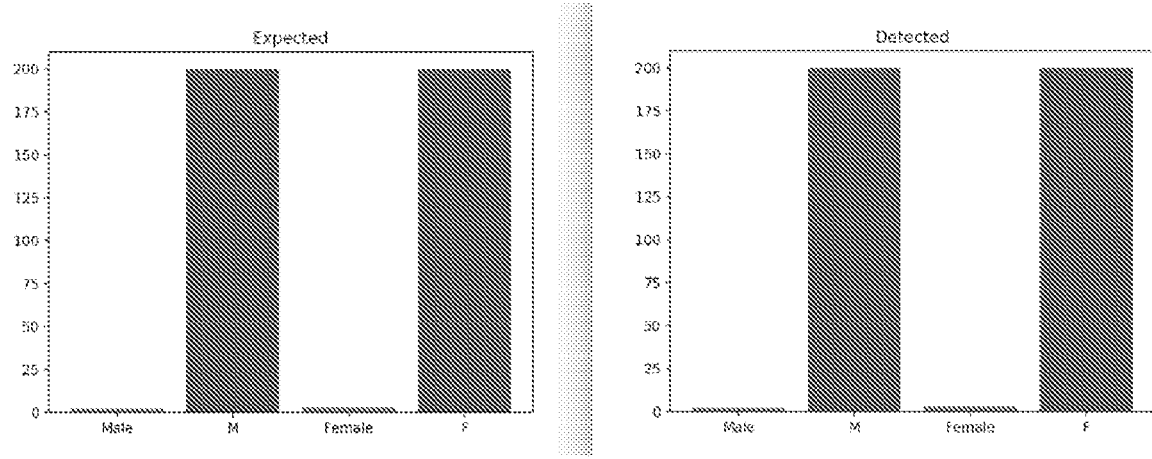

Red means anomaly, and blue mean non-anomaly.

Histogram for suggestion model

Run it through histoSuggestion.py
- On line 35, change the model file name
  saver = tf.train.import_meta_graph('suggestionConv/conv-suggest-10000.meta', clear_devices=True)
- On line 9, change to use word2vec or not. If false, ntlk will be used instead.
  useWord2Vec = True A histogram will be produced for the suggestion: (green - expected, blue - suggestion)

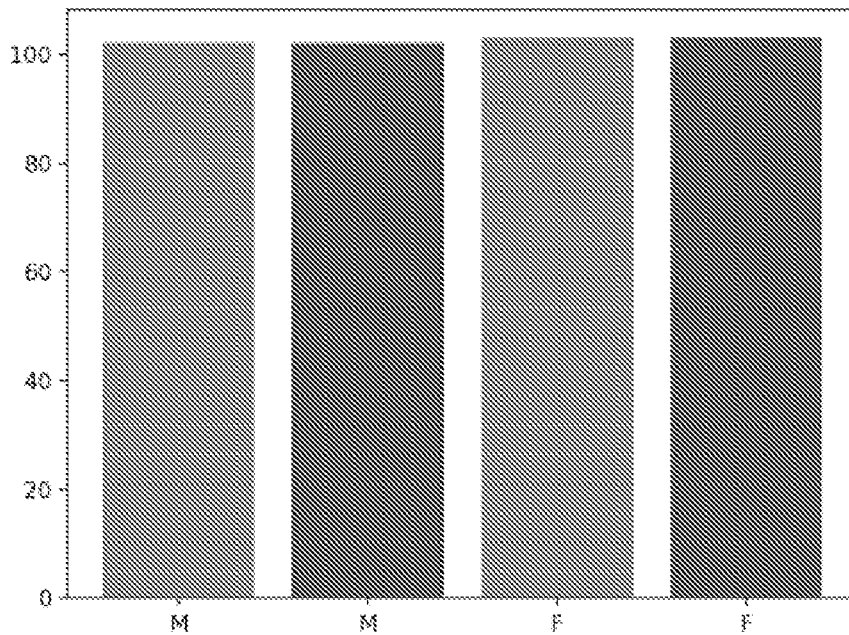

Generating Custom Test Data

Test data for each hint are located in training.py. There are five pre generated data for similarity and dissimilarity word bank:
- *generateSemanticSimilarityData()*
- *generateFormatData()*
- *generateCosineSimilarityData()*
- *generateLengthData()*
- *generateSoundexData()*

Frequency information is embedded in each vector that the 5 above functions generate. Random words are selected from each bank for both similar and dissimilar case. To generate your own test data, simply call into *training.generateAnomalyDataFromDictionary()* with size of the similarity and dissimilarity bank that you want to generate, the type of the data, and starting word if you want to provide. It'll randomly pick data from the dictionary to satisfy the requirement. Note: Unless the size for the generated vector is super short, the function will most likely fail due to word exhaustion. For each word that it picks from the dictionary, it needs to find a word that satisfy the similarity function of all previously picked word, and for each dissimilarity word it picks, it'll have to satisfy the threshold for the inverse similarity function of all words in similarity vector and all in dissimilarity vector. As you can see it gets hard to the next word extremely hard. Hence, the pre generated data in each hint contains 13 similar, and 3 dissimilar words.

You can use *training.generateTestData()* as a wrapper, where it basically keeps on trying until it finds the vector that satisfies your requests (which means it might never return depending on the size!)

What is claimed is:

1. An anomalous field value detection method, including:
determining which field values in a set of field values for a particular field in a fielded dataset are anomalous, including
comparing a particular unique field value to other unique field values for the particular field by
applying a plurality of similarity measures and generating a factor vector that has one scalar for each of the unique field values, wherein the factor vector is calculated by calculating inner products between respective similarity measure values of the unique field values in the dataset to form a similarity matrix and calculating row-wise averages of the inner products in the similarity matrix as elements of the factor vector;
evaluating the factor vector using convolution filters in a convolutional neural network (abbreviated CNN) to generate evaluation vectors;
further evaluating the evaluation vectors using a fully-connected (abbreviated FC) neural network to produce an anomaly scalar for the particular unique field value; and
thresholding the anomaly scalar to determine whether the particular unique field value is anomalous.

2. The method of claim 1, wherein the plurality of similarity measures include semantic similarity, syntactic similarity, soundex similarity, character-by-character format similarity, field length similarity, and dataset frequency similarity.

3. The method of claim 1, further including:
determining that one or more field values in the fielded dataset are similar to an input value for a particular field, including
comparing a particular input value to unique field values for the particular input field by
applying a plurality of similarity measures and generating a factor vector that has one scalar for each of the unique field values;
evaluating the factor vector using the convolution filters in the CNN to generate evaluation vectors for similarity to the unique field values;
further evaluating the evaluation vectors using the FC neural network to produce suggestion scalars for similarity to the particular input value; and
using the suggestion scalars to determine one or more suggestion candidates for the particular input value.

4. A method of detecting linguistically anomalous field values in a dataset, the method including: calculating at least one factor vector for each of a plurality of linguistic similarity measures, including for a given linguistic similarity measure, calculating its factor vector by calculating an inner product between respective similarity measure values of unique field values in the dataset to form a similarity matrix, and calculating row-wise averages of inner product results in the similarity matrix as elements of the factor vector; providing the factor vectors as input to a convolutional neural network (abbreviated CNN) and applying convolution filters to the factor vectors to generate evaluation vectors; providing the evaluation vectors as input to a fully-connected (abbreviated FC) neural network to accumulate element-wise weighted sums of the evaluation vectors in an output vector; and applying a nonlinearity function to the output vector to produce a normalized output vector and thresholding the normalized output vector to identify anomalous and similar field values in the dataset.

5. The method of claim 4, wherein the plurality of linguistic similarity measures include semantic similarity, syntactic similarity, soundex similarity, character-by-character format similarity, field value length similarity, and dataset frequency similarity.

6. The method of claim 4, wherein an element of the factor vector for the given linguistic similarity measure specifies a likelihood that a corresponding unique field value in the dataset is anomalous in a context of the given linguistic similarity measure and conditioned on respective similarity measure values of other unique field values in the dataset for the given linguistic similarity measure.

7. The method of claim 4, further including constructing the input to the CNN by column-wise arranging the factor vectors in an input matrix.

8. The method of claim 7, wherein the convolution filters apply row-wise on the input matrix.

9. The method of claim 8, wherein a row in the input matrix represents a vector that encodes a likelihood that a corresponding unique field value in the dataset is anomalous in a context of the plurality of linguistic similarity measures and conditionable on respective similarity measure values of other unique field values in the dataset for the plurality of linguistic similarity measures.

10. The method of claim 4, further including:
automatically constructing positive and negative examples for inclusion in a training dataset by:
for a given linguistic similarity measure,
determining a first set of similar field values from a vocabulary and
determining a second set of dissimilar field values from the vocabulary; and
randomly selecting some field values from the first and second sets as positive and negative examples respectively;
iterating the determining and the selecting for a plurality of similarity measures; and
storing the randomly selected field values for the plurality of similarity measures as the training dataset.

11. The method of claim 10, further including training the CNN and the FC neural network using the positive and negative examples in the training dataset.

12. The method of claim 4, further including:
using at least two cost functions to evaluate performance of the CNN and the FC neural network during training, including
a first cost function that evaluates classification of unique field values as anomalies; and
a second cost function that evaluates classification of unique field values as non-anomalies.

13. The method of claim 12, further including calculating separate gradients for the two cost functions and back propagating the gradients to the CNN and the FC neural network during training.

14. The method of claim 4, wherein the CNN is a one-layer CNN.

15. The method of claim 4, wherein the CNN is a two-layer CNN.

16. A system including one or more processors coupled to memory, the memory loaded with computer instructions to detect an anomalous field value, the instructions, when executed on the processors, implement actions comprising:
determining which field values in a set of field values for a particular field in a fielded dataset are anomalous, including
comparing a particular unique field value to other unique field values for the particular field by applying a plurality of similarity measures and
generating a factor vector that has one scalar for each of the unique field values, wherein the factor vector is calculated by calculating inner products between respective similarity measure values of the unique field values in the dataset to form a similarity matrix and calculating row-wise averages of the inner products in the similarity matrix as elements of the factor vector;

evaluating the factor vector using convolution filters in a convolutional neural network (abbreviated CNN) to generate evaluation vectors;

further evaluating the evaluation vectors using a fully-connected (abbreviated FC) neural network to produce an anomaly scalar for the particular unique field value; and thresholding the anomaly scalar to determine whether the particular unique field value is anomalous.

17. A non-transitory computer readable storage medium impressed with computer program instructions to detect an anomalous field value, the instructions, when executed on a processor, implement a method comprising:

determining which field values in a set of field values for a particular field in a fielded dataset are anomalous, including
comparing a particular unique field value to other unique field values for the particular field by applying a plurality of similarity measures and generating a factor vector that has one scalar for each of the unique field values, wherein the factor vector is calculated by calculating inner products between respective similarity measure values of the unique field values in the dataset to form a similarity matrix and calculating row-wise averages of the inner products in the similarity matrix as elements of the factor vector;

evaluating the factor vector using convolution filters in a convolutional neural network (abbreviated CNN) to generate evaluation vectors;

further evaluating the evaluation vectors using a fully-connected (abbreviated FC) neural network to produce an anomaly scalar for the particular unique field value; and thresholding the anomaly scalar to determine whether the particular unique field value is anomalous.

18. A system including one or more processors coupled to memory, the memory loaded with computer instructions to detect linguistically anomalous field values in a dataset, the instructions, when executed on the processors, implement actions comprising:

calculating at least one factor vector for each of a plurality of linguistic similarity measures, including for a given linguistic similarity measure, calculating its factor vector by calculating an inner product between respective similarity measure values of unique field values in the dataset to form a similarity matrix, and calculating row-wise averages of inner product results in the similarity matrix as elements of the factor vector; providing the factor vectors as input to a convolutional neural network (abbreviated CNN) and applying convolution filters to the factor vectors to generate evaluation vectors; providing the evaluation vectors as input to a fully-connected (abbreviated FC) neural network to accumulate element-wise weighted sums of the evaluation vectors in an output vector; and applying a nonlinearity function to the output vector to produce a normalized output vector and thresholding the normalized output vector to identify anomalous and similar field values in the dataset.

19. A non-transitory computer readable storage medium impressed with computer program instructions to detect linguistically anomalous field values in a dataset, the instructions, when executed on a processor, implement a method comprising: calculating at least one factor vector for each of a plurality of linguistic similarity measures, including for a given linguistic similarity measure, calculating its factor vector by calculating an inner product between respective similarity measure values of unique field values in the dataset to form a similarity matrix, and calculating row-wise averages of inner product results in the similarity matrix as elements of the factor vector; providing the factor vectors as input to a convolutional neural network (abbreviated CNN) and applying convolution filters to the factor vectors to generate evaluation vectors; providing the evaluation vectors as input to a fully-connected (abbreviated FC) neural network to accumulate element-wise weighted sums of the evaluation vectors in an output vector; and applying a nonlinearity function to the output vector to produce a normalized output vector and thresholding the normalized output vector to identify anomalous and similar field values in the dataset.

* * * * *